(12) United States Patent
Park et al.

(10) Patent No.: US 11,435,848 B2
(45) Date of Patent: Sep. 6, 2022

(54) TOUCH DISPLAY DEVICE, TOUCH DRIVING CIRCUIT, TOUCH CONTROLLER, AND SENSING DATA TRANSMISSION METHOD

(71) Applicant: LG Display Co., Ltd., Seoul (KR)

(72) Inventors: Hyunkyu Park, Gyeonggi-do (KR); Jaehun Jun, Seoul (KR); JuneYoun Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/410,969

(22) Filed: Aug. 24, 2021

(65) Prior Publication Data
US 2022/0206625 A1    Jun. 30, 2022

(30) Foreign Application Priority Data
Dec. 31, 2020  (KR) .......................... 10-2020-0189721

(51) Int. Cl.
*G06F 3/041* (2006.01)
*G06F 3/044* (2006.01)

(52) U.S. Cl.
CPC .......... *G06F 3/0416* (2013.01); *G06F 3/0412* (2013.01); *G06F 3/0446* (2019.05)

(58) Field of Classification Search
None
See application file for complete search history.

(56) References Cited

U.S. PATENT DOCUMENTS

2016/0126968 A1* 5/2016 Lesso ...................... H03M 1/18
                                                    341/155
2017/0060297 A1* 3/2017 Gradinariu ......... H03K 17/9622

* cited by examiner

*Primary Examiner* — Stephen T. Reed
(74) *Attorney, Agent, or Firm* — Seed IP Law Group LLP

(57) ABSTRACT

Embodiments of the present disclosure relate to touch display devices, touch driving circuits, touch controllers, and sensing data transmission methods, provide effects of reducing the amount of sensing data transmitted as a touch driving circuit transmits encoded sensing data to a touch controller.

15 Claims, 20 Drawing Sheets

FIG.12

Sensing Node

| SN0 | SN1 | SN2 | SN3 | SN4 | SN5 | SN6 | SN7 |
|---|---|---|---|---|---|---|---|
| SN8 | SN9 | SN10 | SN11 | SN12 | SN13 | SN14 | SN15 |
| SN16 | SN17 | SN18 | SN19 | SN20 | SN21 | SN22 | SN23 |
| SN24 | SN25 | SN26 | SN27 | SN28 | SN29 | SN30 | SN31 |

SNi : i-th Sensing Node

SENDATA

| T0 | T1 | T2 | T3 | T4 | T5 | T6 | T7 |
|---|---|---|---|---|---|---|---|
| T8 | T9 | T10 | T11 | T12 | T13 | T14 | T15 |
| T16 | T17 | T18 | T19 | T20 | T21 | T22 | T23 |
| T24 | T25 | T26 | T27 | T28 | T29 | T30 | T31 |

Ti : Original Sensing Value of i-th Sensing Node

Differential Coding

ENC_SENDATA

| T0 | d1 | d2 | d3 | d4 | d5 | d6 | d7 |
|---|---|---|---|---|---|---|---|
| T8 | d9 | d10 | d11 | d12 | d13 | d14 | d15 |
| T16 | d17 | d18 | d19 | d20 | d21 | d22 | d23 |
| T24 | d25 | d26 | d27 | d28 | d29 | d30 | d31 |

Ti : Original Sensing Value of i-th Sensing Node
di: Sensing Difference Value of i-th Sensing Node

FIG.15

ENC_SENDATA

| T0  | d1  | T2  | d3  | d4  | d5  | d6  | d7  |
|-----|-----|-----|-----|-----|-----|-----|-----|
| T8  | d9  | d10 | d11 | d12 | d13 | d14 | d15 |
| T16 | d17 | d18 | d19 | d20 | d21 | d22 | d23 |
| T24 | d25 | d26 | d27 | d28 | d29 | d30 | d31 |

Ti : Original Sensing Value of i-th Sensing Node
di: Sensing Difference Value of i-th Sensing Node

TOUCH DISPLAY DEVICE, TOUCH DRIVING CIRCUIT, TOUCH CONTROLLER, AND SENSING DATA TRANSMISSION METHOD

CROSS-REFERENCE TO RELATED APPLICATION

This application claims the priority benefit Republic of Korea Patent Application No. 10-2020-0189721, filed on Dec. 31, 2020 in the Korean Intellectual Property Office, the disclosure of which is incorporated herein by reference in its entirety.

BACKGROUND

Technical Field

The present disclosure relates to touch display devices, touch driving circuits, touch controllers, and sensing data transmission methods.

Description of the Related Art

As the advent of information society, there have been growing needs for display devices for displaying images. To meet such needs, recently, various types of display devices, such as a Liquid Crystal Display (LCD) device, an Electroluminescence Display (ELD) device including a Quantum-dot Light Emitting Display device, and an Organic Light Emitting Display (e.g., OLED) device, and the like, have been developed and widely used.

Among such display devices, by diversifying away from typical input devices, such as buttons, keyboards, mice, and the like, touch display devices capable of providing a touch-based input function or technique that enables users to input information or commands intuitively and conveniently are increasingly popular.

To sense a touch performed by a user, the touch display device may include a touch panel, a touch driving circuit for providing sensed data obtained by sensing the touch panel, and a touch controller for receiving the sensed data from the touch driving circuit and determining touch coordinates.

When the number of touch electrodes in the touch panel increases to provide high-performance touch sensitivity, an amount of sensing data transmitted between the touch driving circuit and the touch controller also increases in a degree of corresponding to the increase of the touch electrodes.

BRIEF SUMMARY

The inventors of the present disclosure have appreciated the benefit of increasing the touch electrodes to improve touch sensitivity. However, the inventors have also recognized that such increase in the amount of transmitted data causes disadvantages of increasing the processing load of the touch driving circuit and the touch controller, thereby reducing the speed of touch sensing, and increasing power consumption.

Taking into consideration of the above identified problem in the related art as well as other technical problems in the related art, the inventors have provided touch display devices, touch driving circuits, touch controllers, and sensing data transmission methods capable of reducing the amount of transmitted data and the amount of data transmission time in a touch system in accordance with one or more embodiments of the present disclosure.

Embodiments of the present disclosure provide touch display devices, touch driving circuits, touch controllers, and sensing data transmission methods capable of significantly reducing the amount of data transmitted in a touch system by using encoding techniques.

Embodiments of the present disclosure provide touch display devices, touch driving circuits, touch controllers, and sensing data transmission methods capable of reducing the number of times of data transmission in a touch system.

Embodiments of the present disclosure provide touch display devices, touch driving circuits, touch controllers, and sensing data transmission methods capable of increasing the speed of touch sensing.

Embodiments of the present disclosure provide touch display devices, touch driving circuits, touch controllers, and sensing data transmission methods capable of reducing power consumption.

According to aspects of the present disclosure, a touch display device is provided that includes a touch panel including a plurality of sensing nodes, a touch driving circuit configured to generate encoded sensing data by encoding sensing data obtained through the sensing of all, or one or more, of the plurality of sensing nodes, and transmit the encoded sensing data, and a touch controller configured to restore the sensing data by decoding the encoded sensing data, and determine the presence or absence of a touch or near touch or touch coordinates based on the restored sensing data.

The plurality of sensing nodes may include a first sensing node and a second sensing node that are located adjacent to each other.

The sensing data may include a sensing value of the first sensing node and a sensing value of the second sensing node.

The encoded sensing data may include the sensing value of the first sensing node and an encoded sensing value of the second sensing node.

The encoded sensing value of the second sensing node may be a difference value between the sensing value of the second sensing node and the sensing value of the first sensing node.

Each of the sensing value of the first sensing node and the sensing value of the second sensing node may be a bit stream of S number of bits, and the encoded sensing value may be a bit stream of D number of bits smaller than S number of bits.

A sensing value of a third sensing node adjacent to the second sensing node may be further included in the sensing data.

If a difference value between the sensing value of the third sensing node and the sensing value of the second sensing node can be represented using a bit stream of D number of bits or can be represented using a bit stream of bits resulting from excluding a sign bit from D number of bits, the encoded sensing data may include an encoded sensing value of the third sensing node, and the encoded sensing value of the third sensing node may be a difference value between the sensing value of the third sensing node and the sensing value of the second sensing node.

In this case, the third sensing node may be a sensing node that does not correspond to the touch coordinates.

If the difference value between the sensing value of the third sensing node and the sensing value of the second sensing node cannot be represented using a bit stream of D number of bits or cannot be represented using a bit stream of bits resulting from excluding a sign bit from D number of bits, the encoded sensing data may not include the encoded sensing value of the third sensing node, and may include a predetermined specific bit stream and the sensing value of the third sensing node.

In this case, the third sensing node may be a sensing node that corresponds to the touch coordinates.

The predetermined specific bit stream may be a bit stream including D number of "1's."

When the specific bit stream is identified, the touch controller can recognize a touch occurrence situation.

The plurality of sensing nodes may be grouped into a plurality of sensing groups, and the plurality of sensing groups may include a first sensing group and a second sensing group.

The touch driving circuit may include a sensing unit block configured to output first sensing signals by sensing sensing nodes included in the first sensing group, and to output second sensing signals by sensing sensing nodes included in the second sensing group, an analog-to-digital converter configured to convert the first sensing signals into first sensing values in a digital form during a first conversion period, and to convert the second sensing signals into second sensing values in the digital form during a second conversion period different from the first conversion period, an encoder configured to generate first encoded sensing data by encoding first sensing data including the first sensing values and the second sensing values during a first encoding period, and a communication processor configured to transmit the first encoded sensing data during a first transmission period.

The first encoding period may be terminated after the first conversion period and the second conversion period are terminated, and the first transmission period may be initiated after the first conversion period and the second conversion period are terminated.

The touch driving circuit may transmit an end marker added to an end part of the encoded sensing data.

In another embodiment, the touch driving circuit may transmit information on the number or length of data streams added to a front part of the encoded sensing data.

According to aspects of the present disclosure, a touch driving circuit is provided that includes a touch sensing processor configured to generate sensing data obtained by sensing all, or one or more, of a plurality of sensing nodes, an encoder configured to generate encoded sensing data by encoding the sensing data, and a communication processor configured to transmit the encoded sensing data.

The plurality of sensing nodes may include a first sensing node and a second sensing node that are located adjacent to each other.

The sensing data may include a sensing value of the first sensing node and a sensing value of the second sensing node.

The encoded sensing data may include the sensing value of the first sensing node and an encoded sensing value of the second sensing node.

The encoded sensing value of the second sensing node may be a difference value between the sensing value of the second sensing node and the sensing value of the first sensing node.

According to aspects of the present disclosure, a touch controller is provided that includes a communication processor configured to receive encoded sensing data, a decoder configured to restore the sensing data by decoding the encoded sensing data, and a touch processor unit configured to determine the presence or absence of a touch or near touch or touch coordinates based on the restored sensing data.

The sensing data may include respective sensing values of a first sensing node and a second sensing node located adjacent to each other among a plurality of sensing nodes in a touch panel.

The encoded sensing data may include the sensing value of the first sensing node and an encoded sensing value of the second sensing node.

The encoded sensing value of the second sensing node may be a difference value between the sensing value of the second sensing node and the sensing value of the first sensing node.

According to aspects of the present disclosure, a method of transmitting sensing data is provided that includes generating, by a touch driving circuit, sensing data obtained by sensing all, or one or more, of a plurality of sensing nodes, generating, by the touch driving circuit, encoded sensing data by encoding the sensing data, and transmitting, by the touch driving circuit, the encoded sensing data to a touch controller.

The plurality of sensing nodes may include a first sensing node and a second sensing node that are located adjacent to each other.

The sensing data may include a sensing value of the first sensing node and a sensing value of the second sensing node.

The encoded sensing data may include the sensing value of the first sensing node and an encoded sensing value of the second sensing node.

The encoded sensing value of the second sensing node may be a difference value between the sensing value of the second sensing node and the sensing value of the first sensing node.

According to embodiments of the present disclosure, it is possible to provide touch display devices, touch driving circuits, touch controllers, and sensing data transmission methods capable of reducing the amount of transmitted data and the amount of data transmission time in the touch system.

According to embodiments of the present disclosure, it is possible to provide touch display devices, touch driving circuits, touch controllers, and sensing data transmission methods capable of significantly reducing the amount of data transmitted in the touch system using encoding techniques.

According to embodiments of the present disclosure, it is possible to provide touch display devices, touch driving circuits, touch controllers, and sensing data transmission methods capable of reducing the number of times of data transmission in the touch system.

According to embodiments of the present disclosure, it is possible to provide touch display devices, touch driving circuits, touch controllers, and sensing data transmission methods capable of increasing the speed of touch sensing.

According to embodiments of the present disclosure, it is possible to provide touch display devices, touch driving circuits, touch controllers, and sensing data transmission methods capable of reducing power consumption.

BRIEF DESCRIPTION OF THE SEVERAL VIEWS OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings:

FIG. 12 illustrates example sensing nodes for discussing an encoding technique for encoding sensing data in the touch display device according to aspects of the present disclosure;

FIG. 15 illustrates an example application of the differential coding technique for encoding sensing data when a touch occurs in the touch display device according to aspects of the present disclosure;

DETAILED DESCRIPTION

Figure 1:
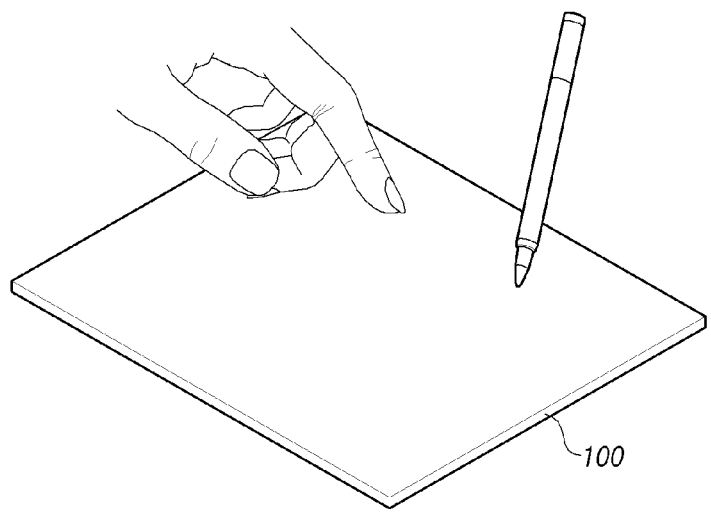
FIG. 1 illustrates a system configuration of a touch display device according to aspects of the present disclosure.

Hereinafter, the one or more embodiments of the disclosure will be described in detail with reference to the accompanying drawings. In denoting elements of the drawings by reference numerals, the same elements will be referenced by the same reference numerals even when the elements are illustrated in different drawings. In the following description of the disclosure, detailed description of known functions and configurations incorporated herein may be omitted when it may make the subject matter of the disclosure rather unclear. The terms such as "including," "having," "containing," "comprising of" and "consist of" used herein are generally intended to allow other components to be added unless the terms are used with the term "only" Singular forms used herein are intended to include plural forms unless the context clearly indicates otherwise.

Further, the terms "first," "second," "A," "B," "(a)," "(b)," or the like may be used to describe elements included in embodiments of the present disclosure. Each of the terms is not used to define essence, order, sequence, or number of an element, but is used merely to distinguish the corresponding element from another element.

Herein, situations in which two or more elements included in embodiments of the present disclosure are connected, combined, coupled, contacted, or the like may include not only directly or physically connecting, combining, coupling, or contacting between two or more elements, but interposing of another element between the two or more elements. Here, the another element may be included in one or more of the two or more elements connected, combined, coupled, or contacted (to) one another.

In describing time relative terms with reference to elements, operations, steps, or processes included in embodiments of the present disclosure, situations in which "after," "subsequent to," "next to," "before," or the like is used to describe a temporal sequential relationship or a flow sequential relationship between events, operations, or the like are generally intended to include events, situations, cases, operations, or the like that do not occur consecutively unless the terms, such as "directly," "immediately," or the like, are used.

The term "unit" may include any electrical circuitry, features, components, an assembly of electronic components or the like. That is, "unit" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "unit."

In some embodiments, the various units described herein may be included in or otherwise implemented by processing circuitry such as a microprocessor, microcontroller, or the like.

Meanwhile, when numerical values for elements included in embodiments of the present disclosure or their associated information (e.g., levels, etc.) are described, even when specific relevant descriptions are not given, the numerical values or the associated information may be interpreted as including a margin of error that can be caused by several factors (e.g., factors in the process, internal or external impact, noise, etc.).

FIG. 1 illustrates a system configuration of a touch display device 100 according to aspects of the present disclosure.

The touch display device 100 according to aspects of the present disclosure is capable of providing an image display function of displaying images, and a touch sensing function of sensing a touch by a touch object such as a finger, a pen, and/or the like. Here, the term 'pen' is sometimes referred to as a stylus or a stylus pen, and may include an active pen that has signal transmission and reception functions, is able to perform an operation through interlinking with the touch display device 100, and/or includes its own power supply, a passive pen that does not have signal transmission and reception functions and/or does not include its own power supply, and the like.

In one embodiment, the touch display device 100 may be a television (TV), a computer monitor, a vehicle monitor, or the like, or may be a mobile device such as a tablet, a smart phone, and the like.

In one embodiment, the touch display device 100 may include a display part for displaying images and a touch sensing part for sensing touches.

Hereinafter, a display part of the touch display device 100 according to aspects of the present disclosure will be described in more detail with reference to FIG. 2. Further, a touch sensing part of the touch display device 100 will be described in more detail with reference to FIGS. 3A and 3B.

Figure 2:
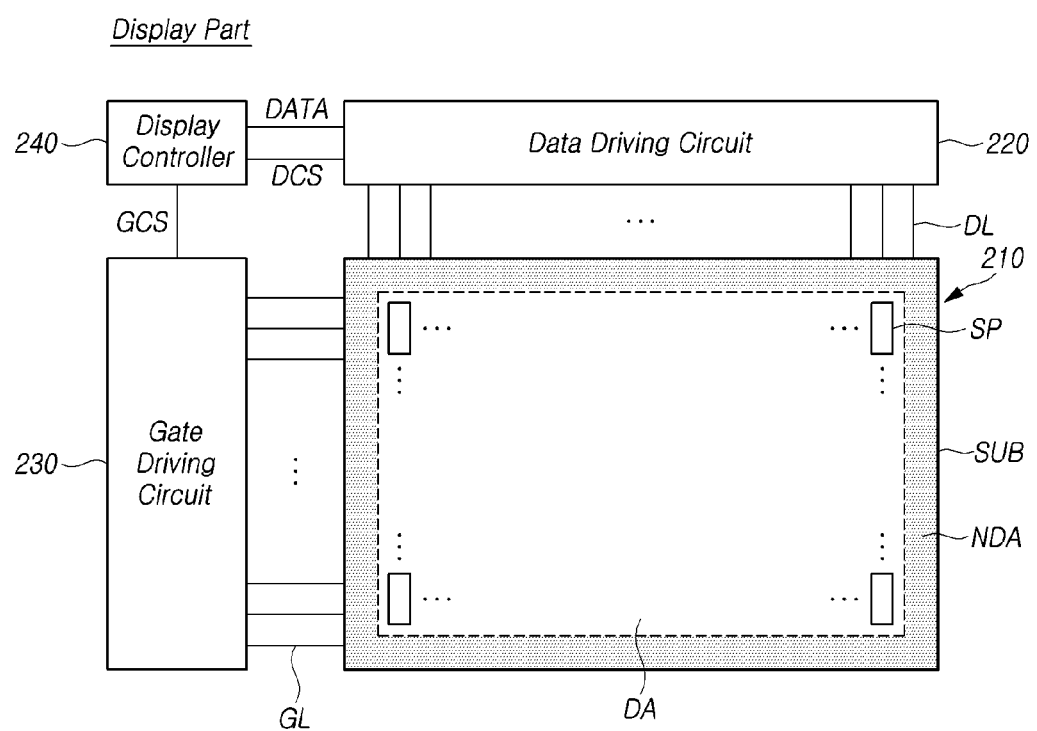
FIG. 2 illustrates a display part of the touch display device according to aspects of the present disclosure.

FIG. 2 illustrates the display part of the touch display device 100 according to aspects of the present disclosure.

Referring to FIG. 2, the display part of the touch display device 100 according to aspects of the present disclosure includes a display panel 210, a data driving circuit 220, a gate driving circuit 230, a display controller 240, and the like.

The display panel 210 may include a substrate SUB, a plurality of data lines DL and a plurality of gate lines GL disposed on or over the substrate SUB, and a plurality of sub-pixels SP disposed on or over the substrate SUB and connected to the plurality of data lines DL and the plurality of gate lines GL.

The display panel 210 may include a display area DA in which an image is displayed and a non-display area NDA in which an image is not displayed. The plurality of sub-pixels SP may be disposed in the display area DA of the display panel 210. Various types of signal lines may be disposed in the non-display area NDA of the display panel 210.

The data driving circuit 220 and the gate driving circuit 230 may be electrically connected to the non-display area NDA of the display panel 210.

The data driving circuit 220 can drive the plurality of data lines DL by supplying data voltages to the plurality of data lines DL.

The gate driving circuit 230 can drive the plurality of gate lines GL by supplying gate signals (referred to as scan signals) to the plurality of gate lines GL.

The display controller 240 can control operations of the data driving circuit 220 and the gate driving circuit 230 by supplying various types of control signals DCS and GCS to the data driving circuit 220 and the gate driving circuit 230.

The display controller 240 starts a scanning operation according to timings scheduled in each frame, converts image data inputted from other devices or other image providing sources (e.g., a host system) to a data signal form used in the data driving circuit 220 and then supplies image data DATA resulting from the converting to the data driving circuit 220, and controls the loading of the data to at least one pixel at a pre-configured time according to a scan timing.

The display controller 240 may be a timing controller TCON used in a typical display device, or a controller including the timing controller.

The display controller 240 may be implemented in the form of a separate component from the data driving circuit 220, or integrated with the data driving circuit 220 and implemented into an integrated circuit.

The data driving circuit 220 may be located on, but not limited to, only one side (e.g., an upper portion or a lower portion) of the display panel 210, or in another embodiment, the data driving circuit DDC may be located on, but not limited to, two sides (e.g., the upper portion and the lower portion) of the display panel 210, according to driving schemes, panel design schemes, or the like.

The data driving circuit 220 may be electrically connected to the non-display area NDA of the display panel 210. In another embodiment, the data driving circuit 220 may be disposed to overlap the display area DA of the display panel 210.

The data driving circuit 220 may be implemented by including at least one source driver integrated circuit. Each source driver integrated circuit may include a shift register, a latch circuit, a digital-to-analog converter DAC, an output buffer, and the like. In some embodiments, each source driver integrated circuit may further include an analog-to-digital converter according to design schemes.

In some embodiments, the data driving circuit 220 may be connected to the display panel 210 in a tape automated bonding (TAB) type, or connected to a conductive pad such as a bonding pad of the display panel 210 in a chip on glass (COG) type or a chip on panel (COP) type, or connected to the display panel 210 in a chip on film (COF) type.

The gate driving circuit 230 may be located on, but not limited to, only one side (e.g., an upper portion, a lower portion, a left side, or a right side) of the display panel 210, or in another embodiment, the gate driving circuit 230 may be located on, but not limited to, two sides (e.g., the upper portion and the lower portion, or the left side and the right side) of the display panel 210, according to driving schemes, panel design schemes, or the like.

The gate driving circuit 230 may be electrically connected to, or disposed in, the non-display area NDA of the display panel 210. In another embodiment, the gate driving circuit 230 may be disposed to overlap the display area DA of the display panel 210.

The gate driving circuit 230 may be implemented by including at least one gate driver integrated circuit. Each gate driving circuit may include a shift register, a level shifter, and the like.

In some embodiments, the data driving circuit 230 may be connected to the display panel 210 in a tape automated bonding (TAB) type, or connected to a conductive pad such as a bonding pad of the display panel 210 in a chip on glass (COG) type or a chip on panel (COP) type, or connected to the display panel 210 in a chip on film (COF) type. In another embodiment, the gate driving circuit 230 may be located in the non-display area NDA of the display panel 210 in a gate in panel (GIP) type. The gate driving circuit 230 may be disposed on or over a substrate SUB, or connected to the substrate SUB. That is, in the case of the GIP type, the gate driving circuit 230 may be disposed in the non-display area NDA of the substrate SUB. The gate driving circuit 230 may be connected to the substrate SUB in the case of the chip on glass (COG) type, the chip on film (COF) type, or the like.

At least one of the data driving circuit 120 and the gate driving circuit 130 may be disposed in the display area DA. For example, at least one of the data driving circuit 120 and the gate driving circuit 130 may be disposed not to overlap sub-pixels SP, or disposed to overlap one or more, or all, of the sub-pixels SP.

The display panel 210 may be one of various types of display panels such as a liquid crystal display panel, an organic light emitting display panel, an electroluminescence display panel, a plasma display panel, and the like.

Figure 3A:
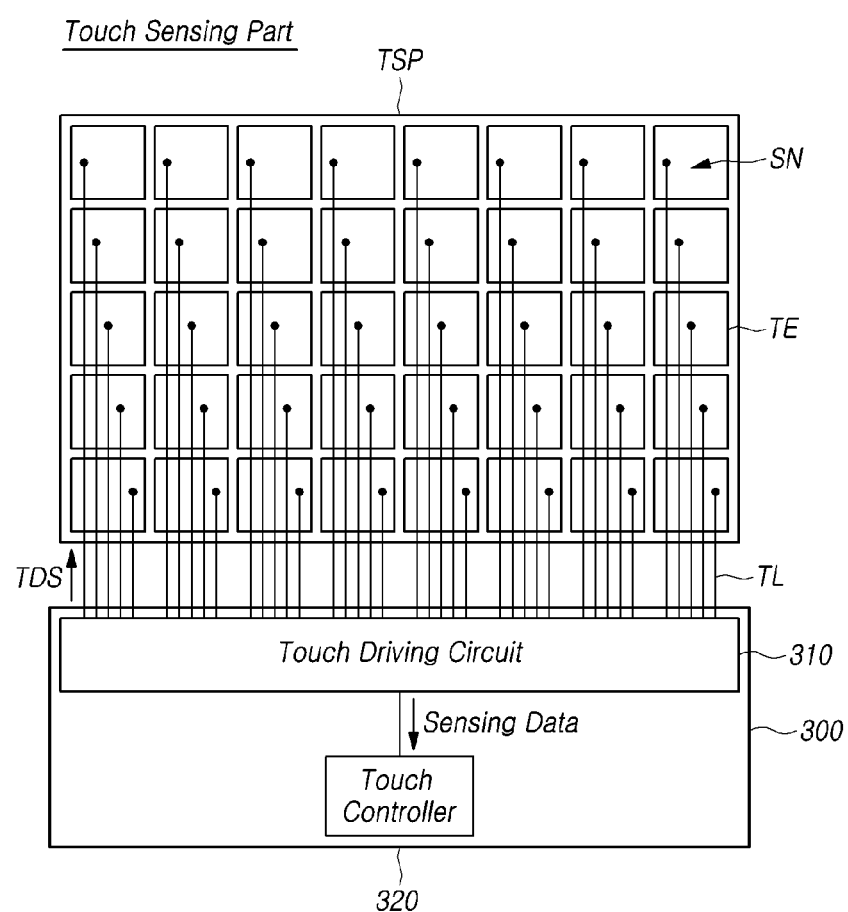
FIGS. 3A and 3B illustrate a touch sensing part of the touch display device according to aspects of the present disclosure.
Figure 3B:
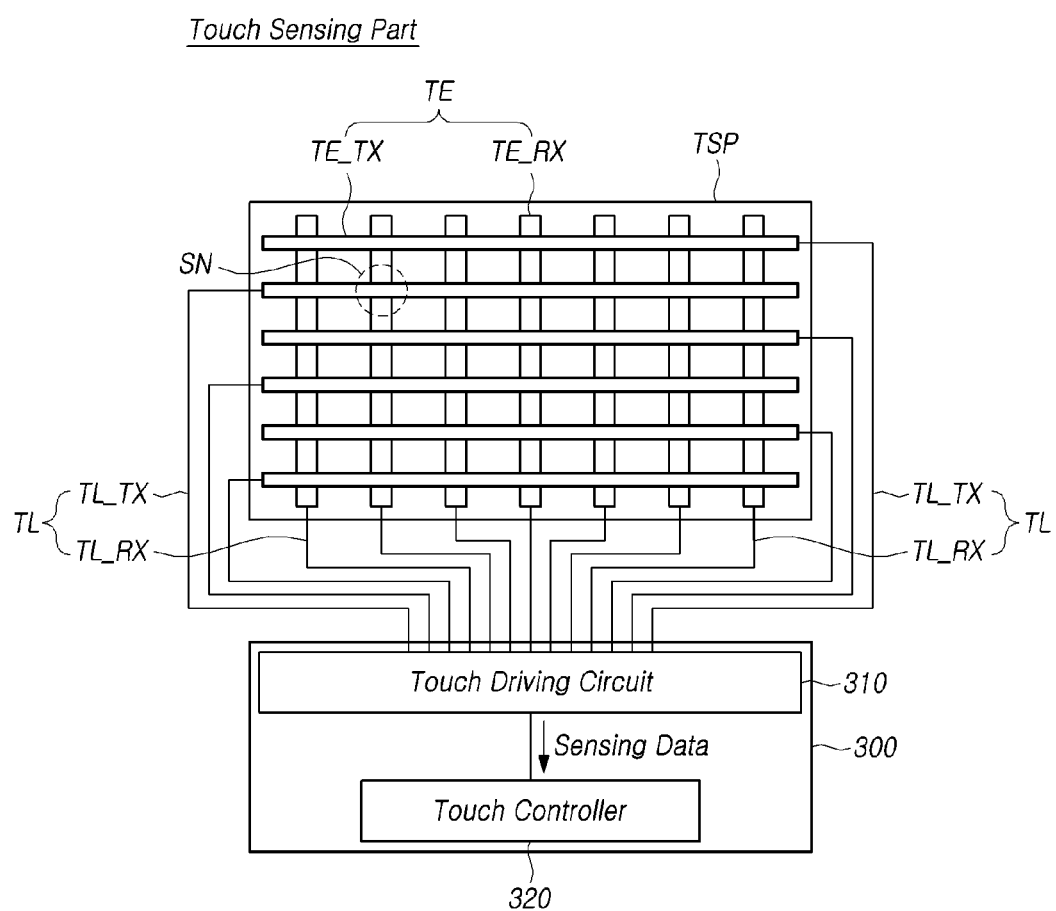

FIGS. 3A and 3B illustrate a touch sensing part of the touch display device according to aspects of the present disclosure.

Referring to FIGS. 3A and 3B, a touch sensing system of the touch display device 100 according to aspects of the present disclosure may include a touch panel TSP and a touch sensing circuit 300 to sense a touch or near touch performed by a conductive object such as a finger and/or a pen.

Referring to FIGS. 3A and 3B, the touch sensing circuit 300 may include a touch driving circuit 310 that drives and senses the touch panel TSP and outputs sensing data, and a touch controller 320 that receives the sensing data from the touch driving circuit 310 and determines the presence or absence of a touch or near touch and/or touch coordinates (a touch location) by performing a touch algorithm.

Referring to FIGS. 3A and 3B, the touch panel TSP may include one or more touch sensors including a plurality of touch electrodes TE. The touch panel TSP may further include a plurality of touch lines TL for electrically connecting the plurality of touch electrodes TE to the touch driving circuit 310.

Referring to FIGS. 3A and 3B, the touch driving circuit 310 can supply a touch driving signal TDS to one or more, or all, of the plurality of touch electrodes TE, generate sensing data by sensing one or more, or all, of the plurality of touch electrodes TE, and supply the generated sensing data to the touch controller 320. Here, the sensing of the touch electrode TE by the touch driving circuit 310 may mean detecting an electric signal from the touch electrode TE.

The touch controller 320 can communicate with the touch driving circuit 310, control the operation of the touch driving circuit 310, and determine the presence or absence of a touch or near touch and/or touch coordinates (a touch location) by performing a touch algorithm using the sensing data received from the touch driving circuit 310.

The touch controller 320 can supply a touch synchronization signal for controlling an operation timing of the touch driving circuit 310 to the touch driving circuit 310. The touch controller 320 can supply a touch driving signal TDS or a signal corresponding thereto to the touch driving circuit 310.

The touch driving signal TDS may be a signal whose voltage level is changed over time. In an embodiment, the touch driving signal TDS may have one or more of various types of signals, such as a square wave, a triangle wave, a sine wave, or the like. In an embodiment, when a touch driving signal TDS of a square wave is employed, the touch driving signal TDS may be a pulse width modulation (hereinafter referred to as "PWM") signal.

The touch display device 100 according to aspects of the present disclosure can provide a self-capacitance-based touch sensing function that senses a touch by measuring a capacitance formed across each touch electrode TE or a change in such capacitance, or a mutual-capacitance-based touch sensing function that senses a touch by measuring a capacitance between touch electrodes TE or a change in such capacitance.

The touch display device 100 according to aspects of the present disclosure can provide both the self-capacitance-based touch sensing function and the mutual-capacitance-based touch sensing function. For example, the touch display device 100 can provide the self-capacitance-based touch sensing function and the mutual-capacitance-based touch sensing function in different time periods or durations or different situations.

The touch sensor structure illustrated in FIG. 3A is suitable for self-capacitance-based touch sensing, and the touch sensor structure illustrated in FIG. 3B is suitable for mutual-capacitance-based touch sensing. FIGS. 3A and 3B illustrate the touch sensor structures in the form of equivalent circuits, and accordingly, therefore, it should be understood that in actual implementation, one or more of an electrode shape, an electrode size, an electrode arrangement, a line structure, a line arrangement, and the like may be variously modified.

Referring to FIG. 3A, when the touch display device 100 provides the self-capacitance-based touch sensing function, the touch panel TSP may include a plurality of touch electrodes TE separated from one another, and a plurality of touch lines electrically connecting the plurality of touch electrodes TE and the touch driving circuit 310.

A size of an area in which one touch electrode TE is disposed may correspond to a size of an area in which one sub-pixel SP is disposed. In another embodiment, a size of an area in which one touch electrode TE is disposed may be larger than a size of an area in which one sub-pixel SP is disposed.

When a size of an area in which one touch electrode TE is disposed is larger than a size of an area in which two or more sub-pixels SP are disposed, the touch electrode TE may overlap two or more data lines DL and two or more gate lines GL.

Referring to FIG. 3A, when the touch display device 100 provides the self-capacitance-based touch sensing function, the touch driving circuit 310 can supply a touch driving signal TDS to each of the plurality of touch electrodes TE, and sense the touch electrode to which the touch driving signal is applied, and output sensing data including sensing values obtained through the sensing. Here, the sensing value corresponds to a capacitance formed between a touch object such as a finger, a pen or the like and the touch electrode TE.

In the touch sensor structure of FIG. 3A, each touch electrode TE may correspond to a sensing node SN. The sensing node SN is a point (area, location) corresponding to touch coordinates, and corresponds to the sensing value.

Referring to FIG. 3B, when the touch display device 100 provides the mutual-capacitance-based touch sensing function, a plurality of touch electrodes TE disposed on the touch panel TSP may be classified into driving touch electrodes TE_TX and sensing touch electrodes TE_RX. A plurality of touch lines TL disposed in the touch panel TSP may be classified into driving touch lines TL_TX electrically connected to the driving touch electrodes TE_TX and sensing touch lines TL_RX electrically connected to the sensing touch electrodes TE_RX.

In FIG. 3B, touch electrodes TE arranged in a horizontal direction may be driving touch electrodes TE_TX, and touch electrodes TE arranged in a vertical direction may be sensing touch electrodes TE_RX, However, this is merely for convenience of description, the touch electrodes TE arranged in the vertical direction may be driving touch electrodes TE_TX, and the touch electrodes TE arranged in the horizontal direction may be sensing touch electrodes TE_RX.

Further, FIG. 3B illustrates that each of one driving touch electrode TE_TX and one sensing touch electrode TE_RX has a long bar shape; however, embodiments of the present disclosure are not limited thereto. In some embodiments, each of one driving touch electrode TE_TX and one sensing touch electrode TE_RX may include a plurality of electrodes electrically connected to one another. The driving touch electrode TE_TX is sometimes referred to as a transmission touch electrode, and the sensing touch electrode TE_RX is sometimes referred to as a reception touch electrode.

Referring to FIG. 3B, when the touch display device 100 provides the mutual-capacitance-based touch sensing function, the touch driving circuit 310 can supply touch driving signals TDS to the driving touch electrodes TE_TX, sense the sensing touch electrodes, and output sensing data including sensing values obtained through the sensing. Here, the sensing value corresponds to a capacitance formed between the driving touch electrode TE_TX and the sensing touch electrode TE_RX.

In the touch sensor structure of FIG. 3B, a point (area) where the driving touch electrode TE_TX and the sensing touch electrode TE_RX overlap corresponds to a sensing node SN. The sensing node SN is a point (area, location) corresponding to touch coordinates, and corresponds to the sensing value.

Meanwhile, in the touch display device 100 according to aspects of the present disclosure, the touch panel TSP may be located outside of the display panel 210 or may be embedded in the display panel 210.

When the touch panel TSP is located outside of the display panel 210, the touch panel TSP and the display panel 210 are manufactured in different manufacturing processes, and thereafter, the touch panel TSP and the display panel 210 can be bonded.

When the touch panel TSP is embedded in the display panel 210, a plurality of touch electrodes TE may be formed together during a process in which the display panel 210 is manufactured.

Meanwhile, the plurality of touch electrodes TE may be dedicated electrodes for touch sensing. In another embodiment, the plurality of touch electrodes TE may be electrodes that may be utilized even when display driving is performed. For example, the plurality of touch electrodes TE may be used for display driving as a common electrode to which a common voltage is applied, as well as being used for touch sensing.

Hereinafter, for convenience of description, it is assumed that the touch display device 100 provides the self-capacitance-based touch sensing function, and the touch panel TSP is embedded in the display panel 210.

In an embodiment, in the touch panel TSP of the touch display device 100 according to aspects of the present disclosure, a plurality of touch electrodes TE may be arranged in a matrix pattern. Each of the plurality of touch electrodes TE may be electrically connected to the touch driving circuit 310 through one or more touch lines TL. A plurality of touch lines TL may overlap one or more touch electrodes TE. In some embodiments, the plurality of touch lines TL may be connected to the touch driving circuit 310 by running along an area where the plurality of touch electrodes TE is not disposed.

Although the drawings illustrate that one touch electrode TE or an areal extent occupied by one touch electrode TE has a square block shape, this is merely an example for convenience of description; embodiments described herein are not limited thereto. In an embodiment, the touch electrode TE may be designed in various shapes, such as a diamond, a long rectangle, or the like. The size and shape of each touch electrode TE or an area occupied by each touch electrode TE illustrated in FIGS. 3A and 3B are merely examples for convenience of description and may be variously modified.

One touch electrode TE may be a plate-type electrode having no opening or a mesh-type electrode having at least one opening.

The touch driving circuit 310 and the touch controller 320 may be implemented in the form of respective separate components or implemented in the form of one component. In an embodiment, the touch driving circuit 310 may be implemented using a readout IC, and the touch controller 320 may be implemented using a micro control unit MCU.

Meanwhile, the touch driving circuit 310 and the data driving circuit 220 may be integrated and implemented in one integrated circuit chip. The touch driving circuit in which the touch driving circuit 310 and the data driving circuit 220 are integrated may be implemented in the form of one or more integrated circuit chips.

Figure 4:
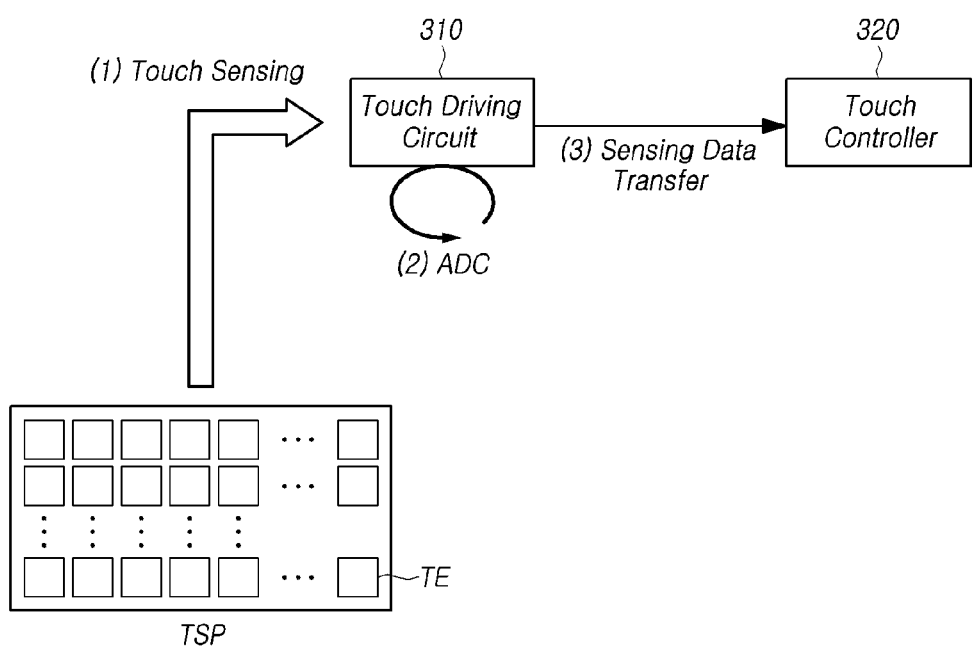
FIG. 4 illustrates touch sensing operation of a touch sensing system according to aspects of the present disclosure.

FIG. 4 illustrates touch sensing operation of a touch sensing system according to aspects of the present disclosure.

Referring to FIG. 4, the touch sensing system according to aspects of the present disclosure may include a touch driving circuit 310 generating sensing data by sensing one or more touch electrodes TE in the touch panel TSP, and transmitting the sensing data, a touch controller 320 receiving the sensing data from the touch driving circuit 310, and determining the presence or absence of a touch or near touch and/or a touch location based on the received sensing data, and the like.

The touch driving circuit 310 can apply a touch driving signal TDS to touch electrodes TE, convert sensing signals detected through the touch electrodes TE into sensing values in a digital form, generate sensing data including the converted sensing values, and transmit the generated sensing data to the touch controller 320.

The touch driving circuit 310 can perform a touch sensing process in which a touch driving signal TDS is supplied to one or more touch electrodes TE, and the one or more touch electrodes TE are sensed. Here, a period in which the touch sensing process is performed may be referred to as a touch sensing period.

The touch driving circuit 310 can perform an analog-to-digital converting (hereinafter referred to as "ADC") process in which a sensing signal detected through a touch electrode TE is converted into a sensing value in the digital form. Here, a period in which the ADC process is performed may be referred to as an ADC period.

The touch driving circuit 310 can transmit sensing data including sensing values converted through the ADC process. Here, a period in which the sensing data is transmitted may be referred to as a sensing data transmission period.

Figure 5:
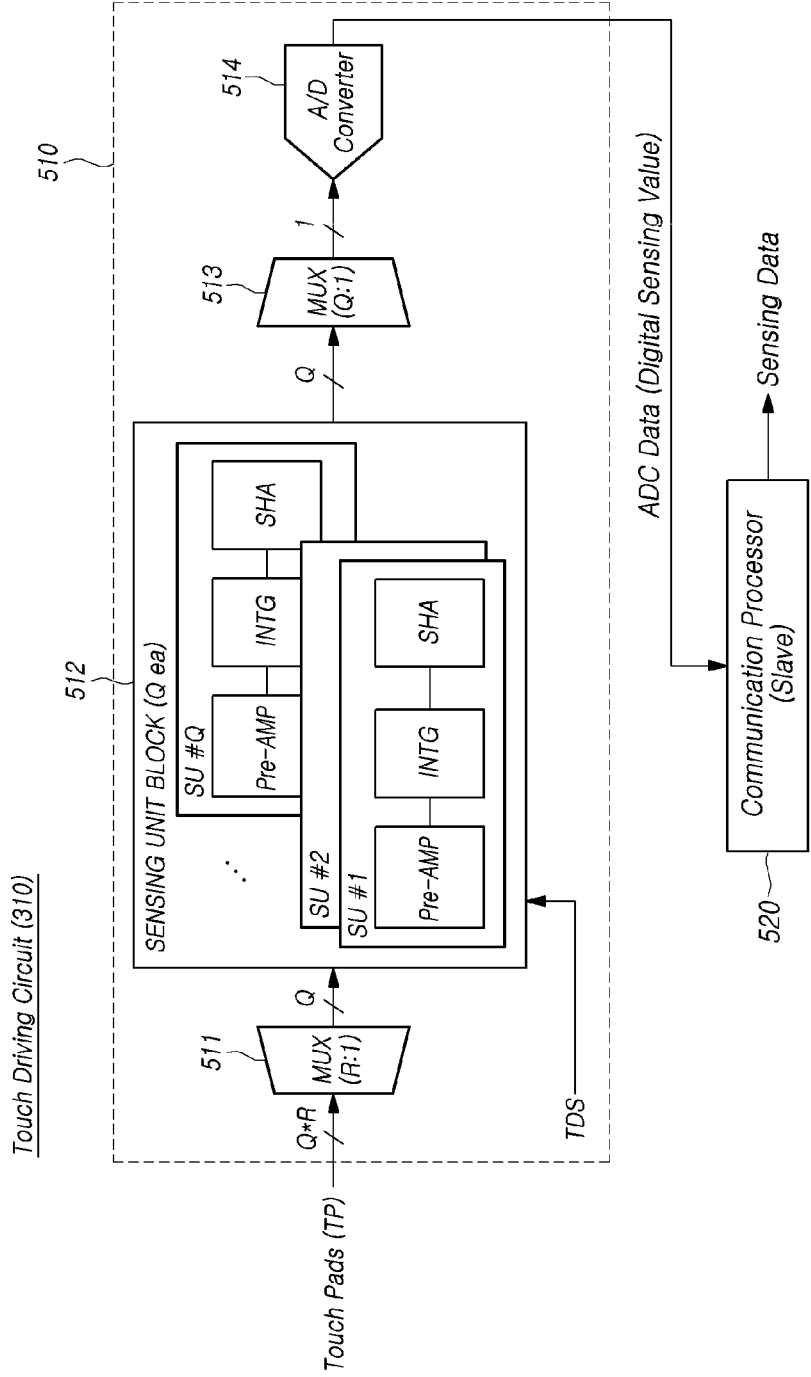
FIG. 5 illustrates a touch driving circuit according to aspects of the present disclosure.
Figure 6:
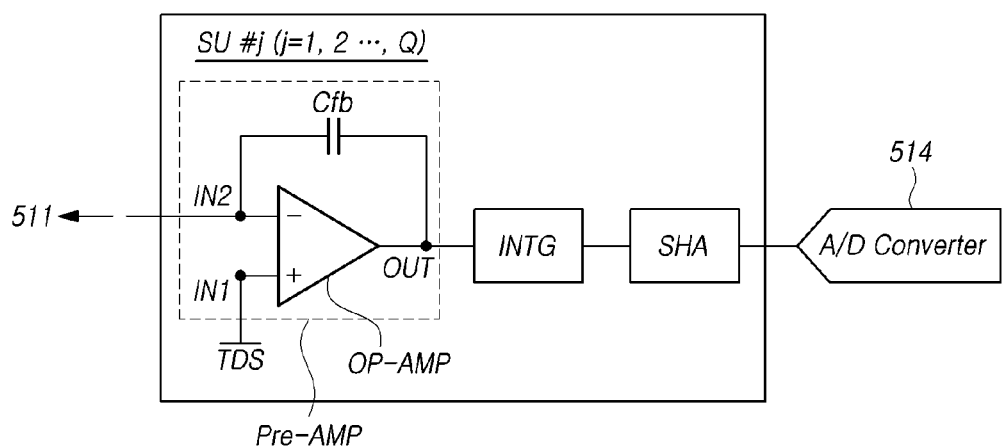
FIG. 6 illustrates a sensing unit in the touch driving circuit according to aspects of the present disclosure.

FIG. 5 illustrates the touch driving circuit according to aspects of the present disclosure. FIG. 6 illustrates a sensing unit in the touch driving circuit 310 according to aspects of the present disclosure.

Referring to FIG. 5, the touch driving circuit 310 may include a touch sensing processor 510 for performing a touch sensing process and an analog-to-digital converting process, a communication processor 520 for performing data transmission and reception by communicating with the touch controller 320, and the like.

"Touch sensing process" as used herein indicates a sensing process for the touch panel TSP, that is, means that the touch driving circuit 310 drives the touch panel TSP (e.g., by supplying a touch driving signal TDS to the touch electrodes disposed in the touch panel TSP) and receives a touch sensing signal from the touch panel TSP.

The touch sensing processor 510 may include a sensing unit block 512 (referred to as a sensing unit circuit) including Q*R number of touch pads TP, a first multiplexer circuit 511, and Q number of sensing units (SU #1-SU #Q), a second multiplexer circuit 513, an analog-to-digital converter 514, and the like. Here, Q is a natural number of 1 or more, and R is a natural number of 2 or more.

The Q*R number of touch pads TP may be electrically connected to the Q*R number of touch lines TL.

The first multiplexer circuit 511 can select Q number of touch pads TP of the Q*R number of touch pads TP and electrically connect the Q number of touch pads TP to the Q number of sensing units (SU #1-SU #Q). Accordingly, the Q number of touch lines TL electrically connected to the selected Q number of touch pads TP can be electrically connected to the Q number of sensing units (SU #1-SU #Q).

The first multiplexer circuit 511 is a circuit capable of performing R:1 multiplexing, and may include at least one multiplexer.

Referring to FIGS. 5 and 6, each of the Q number of sensing units (SU #j, j=1–Q) may include a pre-amplifier Pre-AMP, an integrator INTG, a sample and hold circuit SHA, and the like.

Referring to FIG. 6, the pre-amplifier Pre-AMP may include an operational amplifier OP-AMP and a feedback capacitor Cfb. The operational amplifier OP-AMP may include a first input terminal IN1 to which a touch driving signal TDS is input, a second input terminal IN2 electrically connected to the first multiplexer circuit 511, and an output terminal OUT from which an output signal is output. The feedback capacitor Cfb may be connected between the second input terminal IN2 and the output terminal OUT of the operational amplifier OP-AMP.

The pre-amplifier Pre-AMP can receive a touch driving signal TDS through the first input terminal IN1 and output the received touch driving signal TDS to the second input terminal IN2.

The touch driving signal TDS output from the second input terminal IN2 of the pre-amplifier Pre-AMP can be supplied to a corresponding touch pad TP through the first multiplexer circuit 511 electrically connected to the second input terminal IN2. Accordingly, the touch driving signal TDS can be applied to a corresponding touch electrode TE through a touch line TL electrically connected to the touch pad TP.

After the touch driving signal TDS is applied to the touch electrode TE, a capacitor may be formed between the touch electrode TE and a touch object (e.g., a finger, pen, etc.). Electrical charges stored in such a capacitor may vary depending on the presence or absence of a touch or near touch.

The electrical charges stored in the capacitor formed between the touch electrode TE and the touch object (e.g., a finger, pen, etc.) may be stored in the feedback capacitor Cfb of the pre-amplifier Pre-AMP.

The first multiplexer circuit 511 is a circuit capable of performing R:1 multiplexing, and can select Q number of signals of signals (touch sensing signals) received from Q*R number of touch pads TP.

The selected Q number of signals are transmitted to the Q number of sensing units (SU #1-SU #Q) in the sensing unit block 512, respectively, and input to the integrator INTG through the preamplifier Pre-AMP in the Q number of sensing units (SU #1-SU #Q).

The integrator INTG can output an integral value of an output signal output to the output terminal OUT of the pre-amplifier Pre-AMP. The integrator INTG may include elements such as a comparator, a capacitor, and the like. The integral value output from the integrator INTG is input to the sample and hold circuit SHA.

The sample and hold circuit SHA is a circuit capable of storing the integral value output from the integrator INTG in a voltage form.

The second multiplexer circuit 513 is a circuit for performing Q:1 multiplexing, and may include at least one multiplexer. The second multiplexer circuit 513 can select one of the Q number of sensing units (SU #1-SU #Q), and supply a voltage held in a sample and hold circuit SHA of the selected sensing unit to the analog-to-digital converter 514.

The analog-to-digital converter 514 can convert the input voltage (sensing signal) into a sensing value in the digital form and output the converted sensing value (ADC Data).

The communication processor 520 of the touch driving circuit 310 can transmit the sensing data including the sensing value(s) to the touch controller 320.

Figure 7:
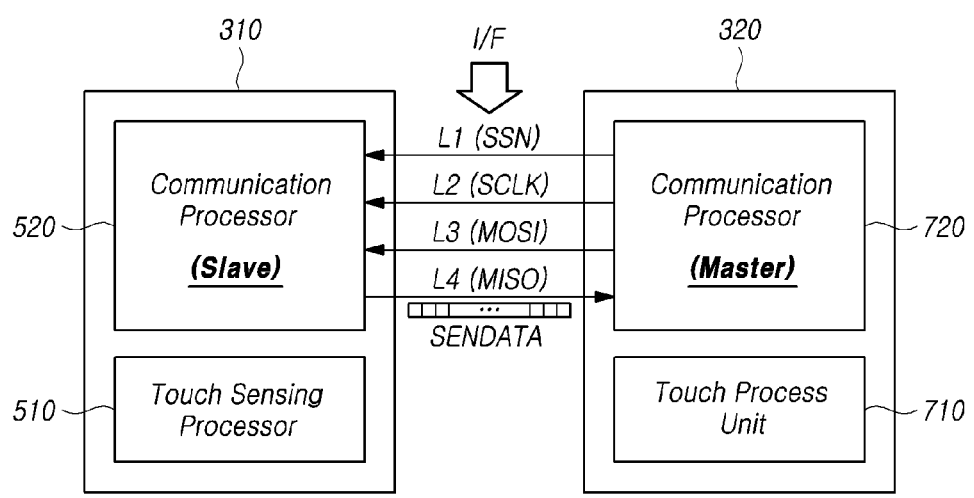
FIG. 7 illustrates operation of the touch driving circuit and a touch controller in the touch sensing system according to aspects of the present disclosure.

FIG. 7 illustrates operation of the touch driving circuit 310 and the touch controller 320 in the touch sensing system according to aspects of the present disclosure.

Referring to FIG. 7, as described above, the touch driving circuit 310 may include the touch sensing processor 510 for performing the touch sensing process and the ADC process, the communication processor 520 for performing data transmission and reception by communicating with the touch controller 320, and the like.

The touch sensing processor 510 may include the first multiplexer circuit 511, the sensing unit block 512, the second multiplexer circuit 512, the analog-to-digital converter 514, and the like.

Referring to FIG. 7, the touch controller 320 may include a communication processor 720 that communicates with the communication processor 520 of the touch driving circuit 310, a touch processor unit 710 (may be referred to as a touch processor) that performs a touch algorithm and determines the presence or absence of a touch or near touch or touch coordinates, and the like.

The communication processor 720 of the touch controller 320 can receive sensing data SENDATA from the communication processor 520 of the touch driving circuit 310 and transmit the received sensing data SENDATA to the touch processor unit 710.

As described above, the sensing data SENDATA is transmitted from the communication processor 520 of the touch driving circuit 310 to the communication processor 720 of the touch controller 320, and a command and the like may be transmitted from the communication processor 720 of the touch controller 320 to the communication processor 520 of the touch driving circuit 310.

The touch sensing system according to embodiments of the present disclosure may include a communication interface I/F for communication between the touch controller 320 and the touch driving circuit 310.

For example, a serial peripheral interface (SPI) or the like can be used to provide the communication interface I/F between the touch controller 320 and the touch driving circuit 310. The serial peripheral interface (SPI) is based on a synchronous serial data connection scheme as an interface that operates in full duplex mode that is a communication scheme using individual links (signal lines) at the same time, and can be employed for enabling the touch driving circuit 310 and the touch controller 320 to transmit and receive data (signals, information).

In the communication interface I/F between the touch controller 320 and the touch driving circuit 310, the touch driving circuit 310 and the touch controller 320 may operate in a master-slave mode. That is, the touch driving circuit 310 may operate as a slave, and the touch controller 320 may operate as a master.

The communication interface I/F between the touch controller 320 and the touch driving circuit 310 may take, but is not limited to, the form of communication software modules included in each of the touch controller 320 and the touch driving circuit 310, communication hardware modules included in each of the touch controller 320 and the touch driving circuit 310, a communication protocol between the touch controller 320 and the touch driving circuit 310, or two or more of the communication software modules, the communication hardware modules, and the communication protocol.

The communication interface I/F between the touch controller 320 and the touch driving circuit 310 may include signal lines, such as a slave selection signal line L1, a clock signal line L2, a master data output line L3, a slave data output line L4, and the like.

The slave selection signal line L1 is a line for allowing the touch controller 320 to output a slave selection signal SSN to the touch driving circuit 310.

The slave selection signal SSN is a signal for allowing the touch controller 320 to select, as a slave for communication, one touch driving circuit 310 from multiple touch driving circuits 310 operating as slaves.

The slave selection signal SSN may have a first state voltage or a second state voltage. Here, the first state voltage indicates that the touch driving circuit 310 which is a slave connected to the slave selection signal line L1 is selected for communication, and the second state voltage indicates that the touch driving circuit 310 that is the slave connected to the slave selection signal line L1 is not selected for communication. For example, the first state voltage may be a low level voltage, and the second state voltage may be a high level voltage. In another example, the first state voltage may be a high level voltage, and the second state voltage may be a low level voltage.

If the touch driving circuit 310 is implemented using an integrated circuit chip (IC Chip), the slave select signal SSN may also be referred to as a chip select signal, and in this case, the slave select signal line L1 may also be referred to as a chip select signal line.

The clock signal line L2 is a line for allowing the touch controller 320 to transmit a clock signal SCLK to the touch driving circuit 310. The clock signal SCLK is a signal for synchronizing operation timings of the touch driving circuit 310.

The master data output line L3 is a line for transmitting master data MOSI from the touch controller 320 to the touch driving circuit 310. Here, the master data MOSI is also referred to as master-out-slave-in data.

The master data output line L4 is a line for transmitting slave data MISO from the touch controller 310 to the touch driving circuit 320. Here, the slave data MISO is also referred to as master-in-slave-out data. Here, sensing data SENDATA output from the touch driving circuit 310 may be one type of the slave data MISO.

Figure 8:
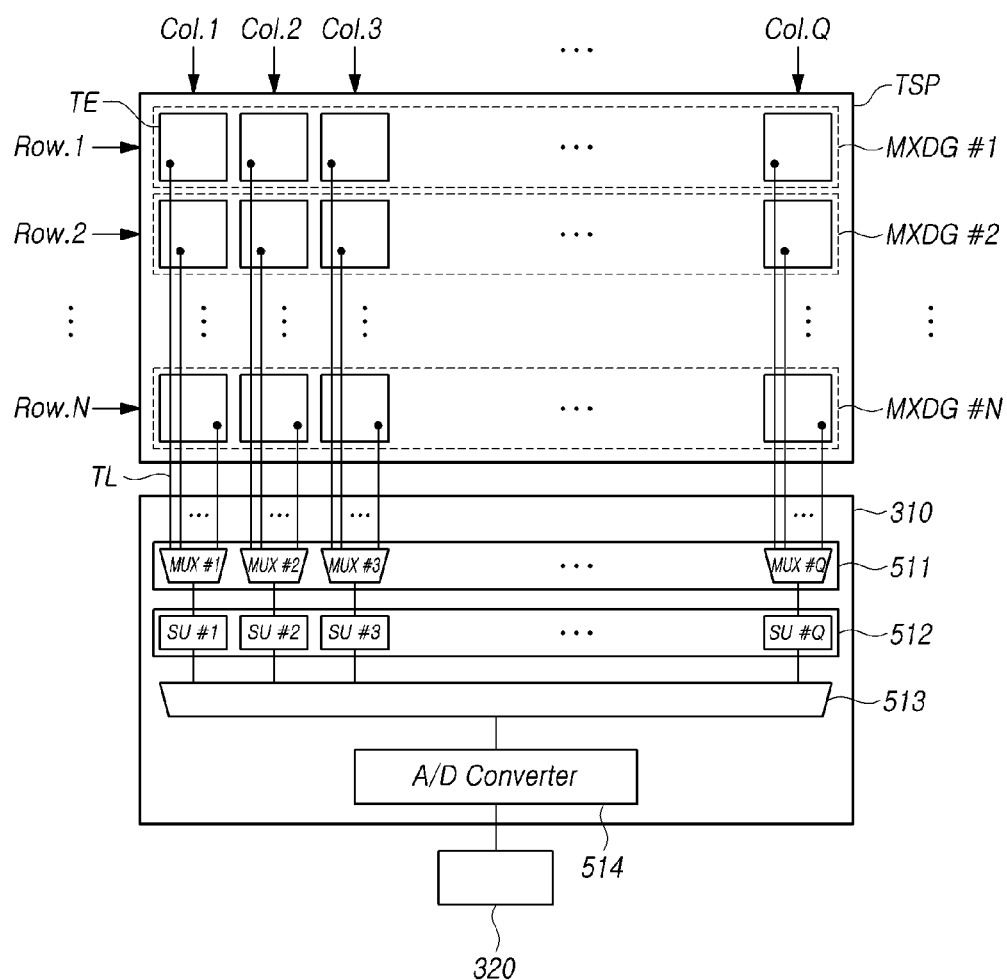
FIG. 8 illustrates a group driving structure of the touch display device according to aspects of the present disclosure.

FIG. 8 illustrates a group driving structure of the touch display device 100 according to aspects of the present disclosure.

Referring to FIG. 8, the touch panel TSP may include a plurality of touch electrodes TE arranged in N rows (Row 1 to Row N) and Q columns (column 1 to column Q). Here, Q is a natural number of 2 or more, and R is a natural number of 1 or more. That is, the touch panel TSP may include N rows of touch electrodes and Q columns of touch electrodes.

In order to drive and sense the plurality of touch electrodes TE included in the touch panel TSP, the touch driving circuit 310 may include a first multiplexer circuit 511 including Q number of first multiplexers (MUX #1 to MUX #Q), a sensing unit block 512 including Q number of sensing units (SU #1 to SU #Q), a second multiplexer circuit 513 including one or more first multiplexers, one or more analog-to-digital converters (514), and the like.

The Q number of first multiplexers (MUX #1 to MUX #Q) may be consistent with the number of touch electrodes TE that can be sensed simultaneously, nearly simultaneously, or together among the plurality of touch electrodes TE. The Q number of sensing units (SU #1 to SU #Q) may correspond to the Q number of first multiplexers (MUX #1 to MUX #Q) on a one-to-one basis.

Q number of touch electrodes TE disposed in each of N number of touch electrode rows can be sensed simultaneously, nearly simultaneously, or together. In this embodiment, the touch driving circuit 310 may include Q number of first multiplexers (MUX #1 to MUX #Q).

In the touch display device 100 according to aspects of the present disclosure, touch electrodes TE that can be simultaneously, or nearly simultaneously, driven and sensed may be defined as forming one multiplexing drive group (MXDG #1 to MXDG #N). That is, the touch driving circuit 310 can simultaneously, or nearly simultaneously supply a touch driving signal TDS to Q number of touch electrodes TE included in each of N number of multiplexing driving groups (MXDG #1 to MXDG #N), and then, simultaneously, or nearly simultaneously, sense all or some of the Q number of touch electrodes TE included in each of the N number of multiplexing driving groups (MXDG #1 to MXDG #N).

Although FIG. 8 illustrates that the number of multiplexing driving groups equals to N, which is the number of touch electrode rows, however, this is merely for convenience of description. The number of multiplexing driving groups may be equal to or different from N, which is the number of touch electrode rows. For example, two touch electrode rows may be included in one multiplexing driving group. In this example, (N/2) number of multiplexing driving groups may be configured for N number of touch electrode rows.

Referring to FIG. 8, in the touch display device 100, the touch driving circuit 310 can simultaneously, or nearly simultaneously, drive and sense Q touch electrodes TE included in each of N number of multiplexing driving groups (MXDG #1 to MXDG #N), while sequentially driving and sensing the N number of multiplexing driving groups (MXDG #1 to MXDG #N).

In the embodiment of FIG. 8, one frame time or period (touch frame time or period) corresponds to a time or period taken by the touch driving circuit 310 to sense all of the N number of multiplexing driving groups (MXDG #1 to MXDG #N).

Each of the Q number of first multiplexers (MUX #1 to MUX #Q) included in the first multiplexer circuit 511 of the touch driving circuit 310 may be connected to N number of touch electrodes TE arranged in a corresponding touch electrode column (e.g., arranged in the same touch electrode column as such a first multiplexer) through N number of touch lines TL. Here, the N number of touch electrodes TE arranged in the same touch electrode column are included one by one in the N number of multiplexing driving groups (MXDG #1 to MXDG #N).

Each of the Q number of first multiplexers (MUX #1 to MUX #Q) included in the first multiplexer circuit 511 of the touch driving circuit 310 can select one of the N number of touch electrodes TE and electrically connect the selected touch electrode TE to one of the Q number of sensing units (SU #1 to SU #Q) included in the sensing unit block 512. Accordingly, each of the Q number of sensing units (SU #1 to SU #Q) included in the sensing unit block 512 can sense the one touch electrode TE selected from the N touch electrodes TE by the first multiplexer circuit 511.

Each of the Q number of first multiplexers (MUX #1 to MUX #Q) included in the first multiplexer circuit 511 can sequentially select the N number of touch electrodes TE so that the touch driving circuit 310 can sequentially sense the N number of multiplexing driving groups (MXDG #1 to MXDG #N #Q). Accordingly, each of the Q number of sensing units (SU #1 to SU #Q) included in the touch driving circuit 310 can sequentially sense the N number of touch electrodes TE.

The second multiplexer circuit 513 included in the touch driving circuit 310 can select one of the Q number of sensing units (SU #1 to SU #Q) and connect the selected sensing unit to the analog-to-digital converter 514. Accordingly, the analog-to-digital converter 514 can convert a signal output by any sensing unit selected from the Q number of sensing units (SU #1 to SU #Q) based on the sensing for corresponding touch electrodes TE into a digital sensing value.

The touch driving circuit 310 can transmit sensing data SENDATA including the sensing values converted into the digital form by the analog-to-digital converter 514 to the touch controller 320.

Figure 9:
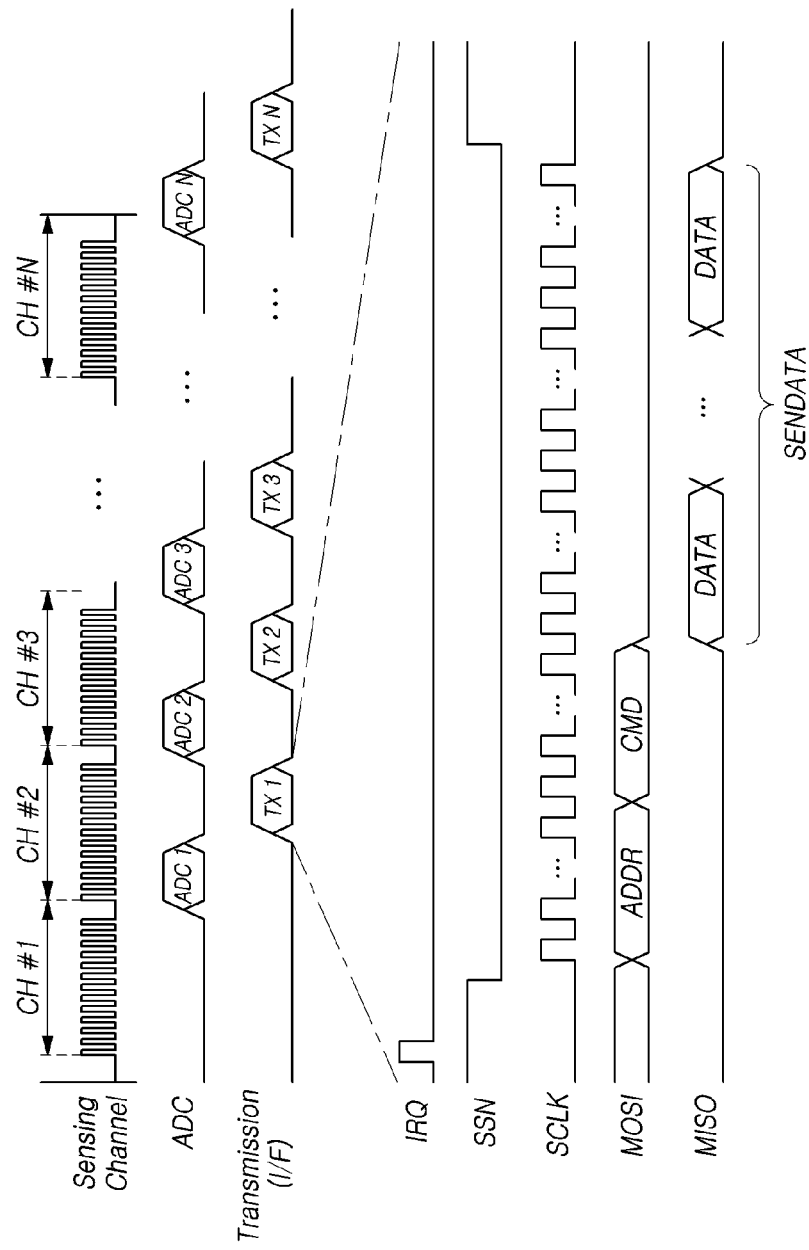
FIG. 9 is a timing diagram related to operation for transmitting sensing data from the touch driving circuit to touch controller in the touch sensing system according to aspects of the present disclosure.

FIG. 9 is a timing diagram related to operation for transmitting sensing data SENDATA from the touch driving circuit 310 to touch controller 320 in the touch sensing system according to aspects of the present disclosure.

Referring to FIG. 9, a plurality of sensing nodes SN may be grouped into N number of sensing groups. Sensing nodes included in each of the N number of sensing groups can be sensed substantially simultaneously or nearly simultaneously, thereby, enabling such sensing nodes to be sensed substantially simultaneously or nearly simultaneously. The N number of sensing groups may correspond to the N number of multiplexing driving groups (MXDG #1 to MXDG #N) of FIG. 8.

The touch driving circuit 310 can sequentially sense respective N number of sensing groups corresponding to N number of sensing channels (CH 1 to CH N). Here, each of the N number of sensing groups may include one or more sensing nodes SN.

While the touch driving circuit 310 sequentially senses respective N number of sensing groups corresponding to N number of sensing channels (CH 1 to CH N), the touch driving circuit 310 can perform analog-to-digital converting (ADC) on sensing signals, and thereafter, generate sensing data SENDATA, and transmit the generated sensing data SENDATA to the touch controller 320 (e.g., Sensing->ADC->Transmission). This will be described in more detail below.

The touch driving circuit 310 can perform a first sensing process for sensing nodes SN included in a first sensing group corresponding to a first sensing channel CH 1, and thereafter, perform a first analog-to-digital converting (ADC 1) process for first sensing signals obtained through the first sensing process.

The touch driving circuit 310 can perform a first transmission process TX 1 in which sensing data SENDATA generated through the first analog-to-digital converting (ADC 1) process are transmitted to the touch controller 320.

When the first analog-to-digital converting (ADC 1) process is completed, the touch driving circuit 310 can perform a second sensing process for sensing nodes SN included in a second sensing group corresponding to a second sensing channel CH 2 while the first transmission process TX 1 is performed, so that the second sensing process can be configured to parallel the first transmission process TX 1.

After performing the second sensing process on the sensing nodes SN included in the second sensing group corresponding to the second sensing channel CH 2, the touch driving circuit 310 can perform a second analog-to-digital converting (ADC 2) process for second sensing signals obtained through the second sensing process.

The touch driving circuit 310 can perform a second transmission process TX 2 in which sensing data SENDATA generated through the second analog-to-digital converting (ADC 2) process are transmitted to the touch controller 320.

When the second analog-to-digital converting (ADC 2) process is completed, the touch driving circuit 310 can perform a third sensing process for sensing nodes SN included in a third sensing group corresponding to a third sensing channel CH 3 while the second transmission process TX 2 is performed, so that the third sensing process can be configured to parallel the second transmission process TX 2.

After performing the third sensing process on the sensing nodes SN included in the third sensing group corresponding to the third sensing channel CH 3, the touch driving circuit 310 can perform a third analog-to-digital converting (ADC 3) process for third sensing signals obtained through the third sensing process.

The touch driving circuit 310 can perform a third transmission process TX 3 in which sensing data SENDATA generated through the third analog-to-digital converting (ADC 3) process are transmitted to the touch controller 320.

Each of first to Nth transmission processes (TX 1 to TX N) between the touch driving circuit 310 and the touch controller 320 can be performed through the communication interface I/F. Hereinafter, a first transmission process TX 1 of first to Nth transmission processes (TX 1 to TX N) will be described as an example with reference to FIGS. 9 and 7 together.

The first transmission process TX 1 is a process for enabling the touch driving circuit 310 to transmit sensing data SENDATA to the touch controller 320, and is a process (read process) in which the touch driving circuit 310 can store the sensing data SENDATA to be supplied to the touch controller 320 in a memory of the touch display device 100, and the touch controller 320 can read the sensing data SENDATA stored in the memory.

Referring to FIGS. 9 and 7 together, when the first analog-to-digital converting (ADC 1) process is completed, to perform the first transmission process TX 1, the touch driving circuit 310 can transmit an interrupt request signal IRQ to the touch controller 320.

The touch driving circuit 310 can transmit the interrupt request signal IRQ through the slave data output line L4. The interrupt request signal IRQ may be a type of the slave data MISO.

Referring to FIGS. 9 and 7, the touch controller 320 can output, through the slave selection signal line L1, a slave selection signal SSN having a first voltage state of the first voltage state and a second voltage state to the touch driving circuit 310 that has transmitted the interrupt request signal IRQ.

The touch controller 320 can output a clock signal SCLK including a plurality of pulses to the touch driving circuit 310 that has transmitted the interrupt request signal IRQ through the clock signal line L2.

Such a slave selection signal SSN may have a first state voltage or a second state voltage. Here, the first state voltage indicates that the touch driving circuit 310 which is a slave connected to the slave selection signal line L1 is selected for communication, and the second state voltage indicates that the touch driving circuit 310 that is the slave connected to the slave selection signal line L1 is not selected for communication.

For example, as illustrated in FIG. 9, the first state voltage may be a low level voltage, and the second state voltage may be a high level voltage. In another example, the first state voltage may be a high level voltage, and the second state voltage may be a low level voltage.

During a period in which the slave selection signal SSN has the first state voltage, the clock signal SCLK has a plurality of pulses. Operation timings of the touch controller 320 and the touch driving circuit 310 are synchronized with the clock signal SCLK.

Referring to FIGS. 9 and 7, after outputting the slave selection signal SSN through the slave selection signal line L1, the touch controller 320 can transmit address information ADDR and command information CMD to the touch driving circuit 310 through the master data output line L3.

The address information ADDR and the command information CMD may be one type of the master data MOSI. The address information ADDR is address information of a memory in the touch display device 100, and is address information in which sensing data SENDATA are to be stored. The command information CMD may include information for providing a process type to the touch driving circuit 310. In relation to transmission of sensing data SENDATA, the command information CMD may include information for providing a read process to the touch driving circuit 310.

Referring to FIGS. 9 and 7, during a period in which the slave selection signal SSN has the first state voltage, the touch driving circuit 310 can recognize a read process as a process type through the command information CMD, and can identify an address in the memory at which the sensing data SENDATA is to be stored through the address information ADDR.

Accordingly, the touch driving circuit 310 can output the sensing data SENDATA generated through the first analog-to-digital converting (ADC 1) process through the slave data output line L4. The sensing data SENDATA may be one type of the slave data MISO.

When the touch driving circuit 310 outputs the sensing data SENDATA through the slave data output line L4, the sensing data SENDATA can be stored in the address in the memory indicated by the address information ADDR.

The touch controller 320 can read data stream DATA corresponding to the sensing data SENDATA stored in the address in the memory indicated by the address information ADDR.

In this manner, the touch controller 320 can obtain all of sensing data SENDATA generated and output by the touch driving circuit 310 through the first to Nth transmission processes (TX 1 to TX N), perform a touch algorithm using the obtained sensing data SENDATA, and determine the presence or absence of a touch or near touch and/or touch coordinates.

As described above, a processing time or period of each of the first and Nth transmission processes (TX 1 to TX N) between the touch driving circuit 310 and the touch controller 320 may become considerably longer depending on the amount of the sensing data SENDATA to be transmitted. When such a processing time or period of each of the first and Nth transmission processes (TX 1 to TX N) becomes longer, a starting time of the sensing process and the analog-to-digital converting (ADC) process is inevitably delayed, thereby, leading the speed of touch sensing processing to be lowered.

To address this issue, according to embodiments of the present disclosure, a method is provided for reducing the amount of data transmitted in the touch sensing system. Hereinafter, a method for reducing the amount of data transmitted in the touch sensing system according to embodiments of the present disclosure will be described in detail.

Figure 10:
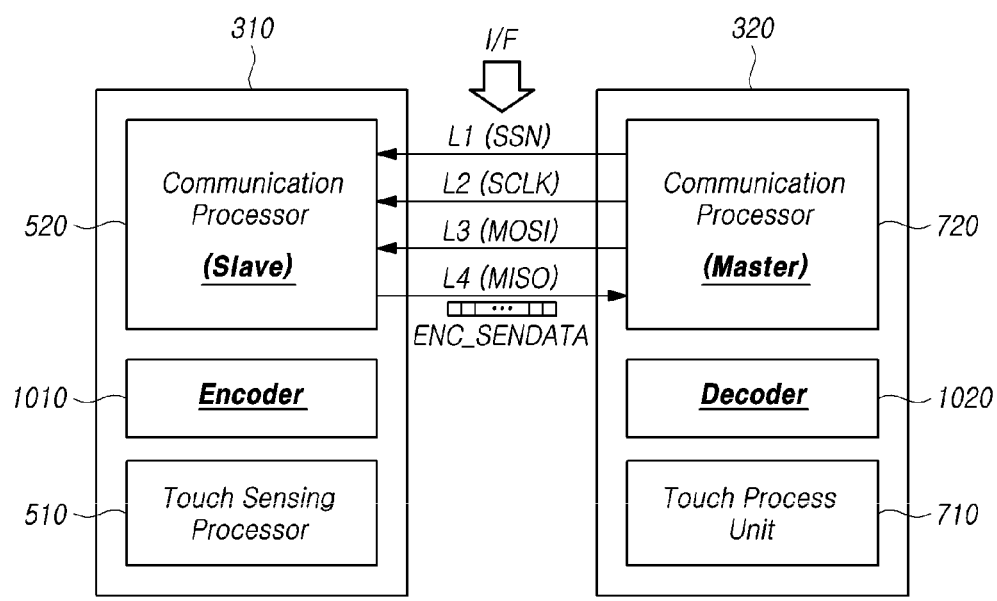
FIG. 10 is a diagram illustrating sensing data encoding for reducing the amount of data transmitted in the touch sensing system of the touch display device according to aspects of the present disclosure.

FIG. 10 is a diagram illustrating sensing data encoding for reducing the amount of data transmitted in the touch sensing system of the touch display device 100 according to aspects of the present disclosure.

Referring to FIG. 10, the touch display device according to aspects of the present disclosure can include a touch driving circuit 310 that is configured to encode sensing data SENDATA obtained by sensing all, or one or more, of a plurality of sensing nodes SN included in the touch panel TSP, and to transmit encoded sensing data ENC_SENDATA generated through the encoding, and a touch controller 320 that is configured to restore the sensing data SENDATA by decoding the encoded sensing data ENC_SENDATA, and to determine the presence or absence of a touch or near touch and/or touch coordinates based on the restored sensing data SENDATA.

In embodiments of the present disclosure, encoding sensing data SENDATA may mean encoding a sensing value included in the sensing data SENDATA.

In embodiments of the present disclosure, each of the plurality of sensing nodes SN may be one touch electrode TE or a location (area, point) thereof, or an overlapping location (area, point) of two touch electrodes TE.

The touch driving circuit 310 according to embodiments of the present disclosure can include a touch sensing processor 510 that is configured to generate sensing data SENDATA obtained by sensing all, or one or more, of the plurality of sensing nodes SN, and an encoder 1010 that is configured to generate encoded sensing data ENC_SENDATA by encoding the sensing data SENDATA, and a communication processor 520 that is configured to transmit the encoded sensing data ENC_SENDATA.

The touch controller 320 according to embodiments of the present disclosure can include a communication processor 720 that is configured to receive the encoded sensing data ENC_SENDATA, a decoder 1020 that is configured to restore the encoded sensing data ENC_SENDATA through decoding on the encoded sensing data ENC_SENDATA, and a touch processor unit 710 that is configured to determine the presence or absence of a touch or near touch and/or touch coordinates based on the restored sensing data SENDATA.

The encoded sensing data ENC_SENDATA are data obtained by encoding the sensing data SENDATA, and has an amount of data smaller than the amount of the sensing data SENDATA. Accordingly, the encoded sensing data ENC_SENDATA may be referred to as compressed data for the sensing data SENDATA.

Thus, as the touch driving circuit 310 encodes the sensing data SENDATA and transmits the encoded sensing data ENC_SENDATA having a smaller data amount than the sensing data SENDATA, thereby, the amount of data transmitted in the touch sensing system can be reduced. Accordingly, the speed of touch sensing can become improved.

Referring to FIG. 10, the touch display device 100 according to aspects of the present disclosure may further include a communication interface (I/F) between the touch controller 320 and the touch driving circuit 310.

The communication interface I/F may take, but is not limited to, the form of communication software modules included in each of the touch controller 320 and the touch driving circuit 310, communication hardware modules included in each of the touch controller 320 and the touch driving circuit 310, a communication protocol between the touch controller 320 and the touch driving circuit 310, or two or more of the communication software modules, the communication hardware modules, and the communication protocol.

The communication interface I/F may include signal lines, such as a slave selection signal line L1, a clock signal line L2, a master data output line L3, a slave data output line L4, and the like.

The slave selection signal line L1 is a line for allowing the touch controller 320 to output a slave selection signal SSN to the touch driving circuit 310.

The slave selection signal SSN is a signal for allowing the touch controller 320 to select, as a slave for communication, one touch driving circuit 310 from multiple touch driving circuits 310 operating as slaves.

The slave selection signal SSN may have a first state voltage or a second state voltage. Here, the first state voltage indicates that the touch driving circuit 310 which is a slave connected to the slave selection signal line L1 is selected for communication, and the second state voltage indicates that the touch driving circuit 310 that is the slave connected to the slave selection signal line L1 is not selected for communication. For example, the first state voltage may be a low level voltage, and the second state voltage may be a high level voltage. In another example, the first state voltage may be a high level voltage, and the second state voltage may be a low level voltage.

The clock signal line L2 is a line for allowing the touch controller 320 to transmit a clock signal SCLK to the touch driving circuit 310. The clock signal SCLK is a signal for synchronizing operation timings of the touch driving circuit 310.

The master data output line L3 is a line for transmitting master data MOSI from the touch controller 320 to the touch driving circuit 310. Here, the master data MOSI is also referred to as master-out-slave-in data.

The master data output line L4 is a line for transmitting slave data MISO from the touch controller 310 to the touch driving circuit 320. Here, the slave data MISO is also referred to as master-in-slave-out data. Here, encoded sensing data ENC_SENDATA output from the touch driving circuit 310 may be one type of the slave data MISO.

Figure 11:
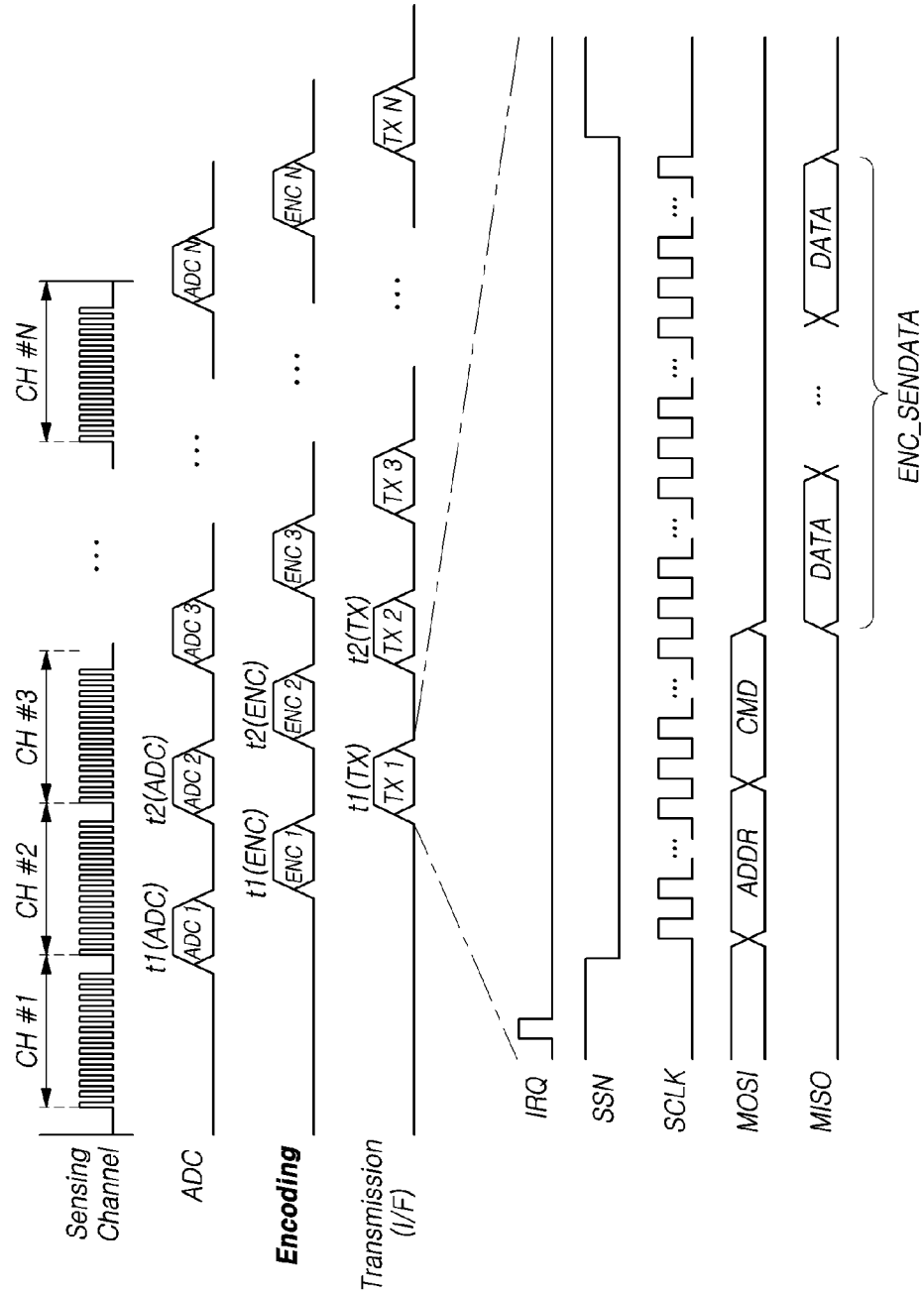
FIG. 11 is a timing diagram related to operation for transmitting encoded sensing data from the touch driving circuit to touch controller in the touch sensing system according to aspects of the present disclosure.

FIG. 11 is a timing diagram related to operation for transmitting encoded sensing data ENC_SENDATA from the touch driving circuit 310 to touch driving controller 320 in the touch sensing system according to aspects of the present disclosure.

Referring to FIG. 11, a plurality of sensing nodes SN may be grouped into a plurality of sensing groups. The plurality of sensing groups may include first to Nth sensing groups. Sensing nodes included in each of the first to Nth sensing groups can be sensed substantially simultaneously or nearly simultaneously, thereby, enabling such sensing nodes to be sensed substantially simultaneously or nearly simultaneously. The first to Nth sensing groups may correspond to the N number of multiplexing driving groups (MXDG #1 to MXDG #N) of FIG. 8.

The touch driving circuit 310 can sequentially sense respective N number of sensing groups corresponding to N number of sensing channels (CH 1 to CH N). Here, each of the N number of sensing groups may include one or more sensing nodes SN.

While the touch driving circuit 310 sequentially senses respective N number of sensing groups corresponding to N number of sensing channels (CH 1 to CH N), the touch driving circuit 310 can generate sensing data SENDATA by performing analog-to-digital converting (ADC) on sensing signals, encode the generated sensing data SENDATA, and transmit the encoded sensing data ENC_SENDATA resulting from the encoding of the sensing data SENDATA to the touch controller 320 (e.g., Sensing->ADC->Transmission). This will be described in more detail below.

The touch driving circuit 310 can perform a first sensing process for sensing nodes SN included in a first sensing group corresponding to a first sensing channel CH 1.

Thereafter, during a first conversion period t1(ADC), the touch driving circuit 310 can perform a first analog-to-digital converting (ADC 1) process for first sensing signals obtained through the first sensing process.

Next, during a first encoding period t1(ENC), the touch driving circuit 310 can generate encoded sensing data ENC_SENDATA by performing a first encoding process ENC 1 for sensing data SENDATA generated through the first analog-to-digital converting (ADC 1) process.

Thereafter, during a first transmission period t1(TX), the touch driving circuit 310 can perform a first transmission process TX 1 in which the encoded sensing data ENC_SENDATA generated through the first encoding process ENC 1 is transmitted to the touch controller 320.

When the first analog-to-digital converting (ADC 1) process is completed, the touch driving circuit 310 can perform a second sensing process for sensing nodes SN included in a second sensing group corresponding to a second sensing channel CH 2 while the first encoding process ENC 1 or the first transmission process TX 1 is performed, so that the second sensing process can be configured to parallel the first encoding process ENC 1 or the first transmission process TX 1.

After performing the second sensing process for the sensing nodes SN included in the second sensing group corresponding to the second sensing channel CH 2, during a second conversion period t2(ADC), the touch driving circuit 310 can perform a second analog-to-digital converting (ADC 2) process for second sensing signals obtained through the second sensing process.

Next, during a second encoding period t2(ENC), the touch driving circuit 310 can generate encoded sensing data ENC_SENDATA by performing a second encoding process ENC 2 for sensing data SENDATA generated through the second analog-to-digital converting (ADC 2) process.

Thereafter, during a second transmission period t2(TX), the touch driving circuit 310 can perform a second transmission process TX 2 in which the encoded sensing data ENC_SENDATA generated through the second encoding process ENC 2 is transmitted to the touch controller 320.

The sensing process, the analog-to-digital converting processing (ADC 1 to ADC N), the encoding processing (ENC 1 to ENC N), and the transmission processing (TX 1 to TX N) for the N sensing groups as described above will be discussed again in terms of the internal components of the touch driving circuit 310.

That is, as the touch driving circuit 310 can include the sensing unit block 512, the analog-to-digital converter 514, the encoder 1010, the communication processor 520, and the like, the above operations will be described again in terms of these internal components.

The sensing unit block 512 of the touch driving circuit 310 can output first sensing signals by sensing sensing nodes SN included in a first sensing group of N number of sensing groups, and output second sensing signals by sensing sensing nodes SN included in a second sensing group of the N number of sensing groups.

The analog-to-digital converter 514 of the touch driving circuit 310 can convert the first sensing signals into first sensing values in a digital form during a first conversion period t1(ADC), and convert the second sensing signals into second sensing values in the digital form during a second conversion period t2(ADC) different from the first conversion period t1(ADC).

The encoder 1010 of the touch driving circuit 310 can generate first encoded sensing data ENC_SENDATA by encoding first sensing data SENDATA including the first sensing values during a first encoding period t1(ENC), and generate second encoded sensing data ENC_SENDATA by encoding second sensing data SENDATA including the second sensing values during a second encoding period t2(ENC) different from the first encoding period t1(ENC).

The communication processor 520 of the touch driving circuit 310 can transmit the first encoded sensing data ENC_SENDATA during a first transmission period t1(TX), and transmit the second encoded sensing data ENC_SENDATA during a second transmission period t2(TX) different from the first transmission period t1(TX).

The first conversion period t1(ADC), the first encoding period t1(ENC), and the first transmission period t1(TX) may be sequentially terminated.

The second conversion period t2(ADC), the second encoding period t2(ENC), and the second transmission period t2(TX) may be sequentially terminate.

Each of first to Nth transmission processes (TX 1 to TX N) between the touch driving circuit 310 and the touch controller 320 can be performed through the communication interface I/F. Hereinafter, a first transmission process TX 1 of first to Nth transmission processes (TX 1 to TX N) will be described as an example with reference to FIGS. 11 and 7 together.

The first transmission process TX 1 is a process for enabling the touch driving circuit 310 to transmit encoded sensing data SENDATA to the touch controller 320, and is a process (read process) in which the touch driving circuit 310 can store the encoded sensing data SENDATA to be supplied to the touch controller 320 in a memory of the touch display device 100, and the touch controller 320 can read the encoded sensing data SENDATA stored in the memory.

Referring to FIGS. 11 and 7 together, when a first analog-to-digital converting (ADC 1) process is completed, to perform the first transmission process TX 1, the touch driving circuit 310 can transmit an interrupt request signal IRQ to the touch controller 320.

The touch driving circuit 310 can transmit the interrupt request signal IRQ through the slave data output line L4. The interrupt request signal IRQ may be a type of the slave data MISO.

Referring to FIGS. 11 and 7, the touch controller 320 can output, through the slave selection signal line L1, a slave selection signal SSN having a first voltage state of the first voltage state and a second voltage state to the touch driving circuit 310 that has transmitted the interrupt request signal IRQ.

The touch controller 320 can output a clock signal SCLK including a plurality of pulses to the touch driving circuit 310 that has transmitted the interrupt request signal IRQ through the clock signal line L2.

Such a slave selection signal SSN may have a first state voltage or a second state voltage. Here, the first state voltage indicates that the touch driving circuit 310 which is a slave connected to the slave selection signal line L1 is selected for communication, and the second state voltage indicates that the touch driving circuit 310 that is the slave connected to the slave selection signal line L1 is not selected for communication.

For example, as illustrated in FIG. 11, the first state voltage may be a low level voltage, and the second state voltage may be a high level voltage. In another example, the first state voltage may be a high level voltage, and the second state voltage may be a low level voltage.

During a period in which the slave selection signal SSN has the first state voltage, the clock signal SCLK has a plurality of pulses. Operation timings of the touch controller 320 and the touch driving circuit 310 are synchronized with the clock signal SCLK.

Referring to FIGS. 11 and 7, after outputting the slave selection signal SSN through the slave selection signal line L1, the touch controller 320 can transmit address information ADDR and command information CMD to the touch driving circuit 310 through the master data output line L3.

The address information ADDR and the command information CMD may be one type of the master data MOSI. The address information ADDR is address information of a memory in the touch display device 100, and is address information in which encoded sensing data ENC_SENDATA are to be stored. The command information CMD may include information for providing a process type to the touch driving circuit 310. In relation to transmission of encoded sensing data ENC_SENDATA, the command information CMD may include information for providing a read process to the touch driving circuit 310.

Referring to FIGS. 11 and 7, during a period in which the slave selection signal SSN has the first state voltage, the touch driving circuit 310 can recognize a read process as a process type through the command information CMD, and can identify an address in the memory at which sensing data SENDATA is to be stored through the address information ADDR.

Accordingly, the touch driving circuit 310 can output encoded sensing data ENC_SENDATA generated through a first encoding process ENC 1 through the slave data output line L4. The encoded sensing data ENC_SENDATA may be one type of the slave data MISO.

When the touch driving circuit 310 outputs the encoded sensing data SENDATA through the slave data output line L4, the encoded sensing data ENC_SENDATA can be stored in the address in the memory indicated by the address information ADDR.

The touch controller 320 can read data stream DATA corresponding to the encoded sensing data ENC_SENDATA stored in the address in the memory indicated by the address information ADDR.

Thereafter, the touch controller 320 can restore the sensed data SENDATA by decoding the read encoded sensing data ENC_SENDATA, and perform a touch algorithm using the restored sensing data SENDATA.

Meanwhile, according to embodiments of the present disclosure, a differential coding technique is provided that is suitable for encoding sensing data SENDATA as a coding technique of sensing data SENDATA. Here, differential coding may be also referred to as differential compression, predictive compression, or predictive coding.

Hereinafter, the differential coding technique according to embodiments of the present disclosure will be described with reference to FIGS. 12 to 15.

Figure 13:
FIGS. 13 and 14 illustrate a differential coding technique for encoding sensing data in the touch display device according to aspects of the present disclosure.
Figure 14:
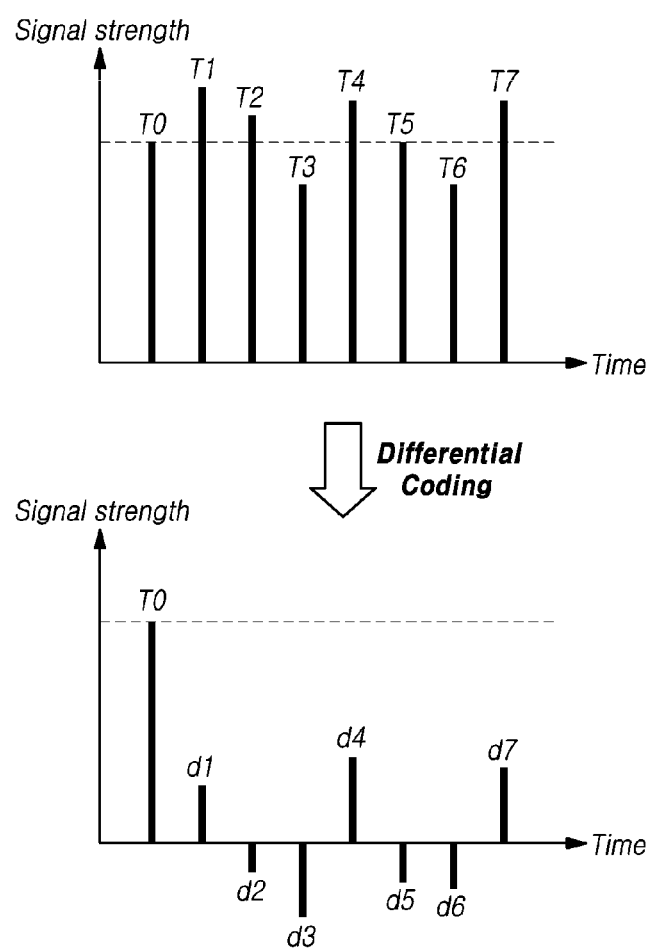

FIG. 12 illustrates example sensing nodes for discussing coding or encoding techniques for encoding sensing data SENDATA in the touch display device 100 according to aspects of the present disclosure. FIGS. 13 and 14 illustrate the differential coding technique for encoding sensing data in the touch display device 100 according to aspects of the present disclosure.

The differential coding technique according to embodiments of the present disclosure is a technique for encoding sensing values using a difference between sensing values between adjacent sensing nodes SN.

In a touch sensing environment, there is a high probability that the sensing values of adjacent sensing nodes SN may be nearly equal to, or have a small difference from, each other. Therefore, a difference between sensing values can be represented using a small number of bits.

Accordingly, by encoding sensing data SENDATA through the differential coding technique, the touch driving circuit 310 can generate encoded sensing data ENC_SENDATA having a data amount much smaller than the sensing data SENDATA. Accordingly, the amount of data transmitted from the touch driving circuit 310 to the touch controller 320 can be greatly reduced.

Referring to FIGS. 12 and 13, according to the differential coding technique, when a plurality of sensing nodes SN includes a first sensing node SN0 and a second sensing node SN1 adjacent to each other, and sensing data include a sensing value T0 of the first sensing node SN0 and a sensing value T1 of the second sensing node SN1, resulting encoded sensing data ENC_SENDATA can include the sensing value T0 of the first sensing node SN0 and an encoded sensing value d1 of the second sensing node SN1.

Here, the encoded sensing value d1 of the second sensing node SN1 is a value obtained by encoding the sensing value T1 of the second sensing node SN1, and may be a difference value between the sensing value T1 of the second sensing node SN1 and the sensing value T0 of the first sensing node SN0.

For example, the sensing values of each of the first sensing node SN0 and the second sensing node SN1 can be represented using 12 bits, and the encoded sensing value d1 of the second sensing node SN1 can be represented using 8 bits.

Such an encoded sensing value may include one, or two or more, sign bits representing a sign (+, −) of a sensing value. Accordingly, when 8 bits are allocated to encoded sensing values, differences between sensing values can be represented using 7 bits.

Hereinafter, the differential coding technique according to embodiments of the present disclosure will be described in detail with reference to FIGS. 12 to 14.

FIG. 12 illustrates 32 sensing nodes (SNi, i=0, 1, 2, . . . , 31) as an example for discussing the differential coding technique according to embodiments of the present disclosure.

Referring to FIG. 12, it is assumed that a plurality of sensing nodes SN included in the touch panel TSP includes 32 sensing nodes (SN0, SN1, SN2, . . . , SN31).

When the touch panel TSP has the structure illustrated in FIG. 3A, the 32 sensing nodes (SN0, SN1, SN2, . . . , SN31) may correspond to 32 touch electrodes TE or locations thereof.

When the touch panel TSP has the structure illustrated in FIG. 3B, the 32 sensing nodes (SN0, SN1, SN2, . . . , SN31) may correspond to 32 overlapping locations at which driving touch electrodes TE_TX and sensing touch electrodes TE_RX overlap.

Referring to FIG. 12, it is assumed that 32 sensing nodes (SN0, SN1, SN2, . . . , SN31) are arranged in 4 rows and 8 columns. That is, sensing nodes of SN0 to SN7 may be arranged in a first row, sensing nodes of SN8 to SN15 may be arranged in a second row, sensing nodes of SN16 to SN23 may be arranged in a third row, and sensing nodes of SN24 to SN31 may be arranged in a fourth row.

A sensing node adjacent to each of sensing nodes (SN0 to SN31) is a sensing node locating on a left side of, and in a row identical to, the corresponding sensing node of sensing nodes (SN0 to SN31). For example, a sensing node adjacent to sensing node SN1 is SN0, a sensing node adjacent to sensing node SN2 is SN1, a sensing node adjacent to sensing node SN9 is SN8, and a sensing node adjacent to sensing node SN11 is SN10.

FIG. 13 illustrates sensing data SENDATA including 32 sensing values (Ti, i=0, 1, 2, . . . , 31) for 32 sensing nodes (SNi, i=0, 1, 2, . . . , 31), and encoded sensing data ENC_SENDATA generated by encoding the sensing data SENDATA.

Referring to FIG. 13, the 32 sensing values (T0, T1, T2, . . . , T31) for the 32 sensing nodes (SNi, i=0, 1, 2, . . . , 31) are values resulting from the ADC processing.

Referring to FIG. 13, the touch driving circuit 310 can transmit sensing values (T0, T8, T16, and T24) for sensing nodes (SN0, SN8, SN16, and SN24) in a first column without any changes, and transmit corresponding encoded sensing values (d1 to d7, d9 to d15, d17 to d23, and d25 to d31) obtained by encoding sensing values (T1 to T7, T9 to T15, T17 to T23, and T25 to T31) for sensing nodes (SN1 to SN7, SN9 to SN15, SN17 to SN23, SN25 to SN31) in second to eighth columns, rather than transmitting the sensing values (T1 to T7, T9 to T15, T17 to T23, and T25 to T31) without any changes.

That is, the encoded sensing data ENC_SENDATA generated and transmitted by the touch driving circuit 310 includes the sensing values (T0, T8, T16, and T24) for sensing nodes (SN0, SN8, SN16, and SN24) in the first column, and the encoded sensing values (d1 to d7, d9 to d15, d17 to d23, and d25 to d31) for sensing nodes (SN1 to SN7, SN9 to SN15, SN17 to SN23, and SN25 to SN31) in the second to eighth columns.

Hereinafter, encoding sensing values using the differential coding technique will be described with reference to FIGS. 13 and 14.

It is assumed that a sensing node adjacent to each of sensing nodes (SN0 to SN31) is a sensing node locating on a left side of, and in a row identical to, the corresponding sensing node of sensing nodes (SN0 to SN31). For example, a sensing node adjacent to sensing node SN1 is SN0, and a sensing node adjacent to sensing node SN2 is SN1.

Referring to FIGS. 13 and 14, the sensing values of sensing nodes (SN0 to SN7) in the first row are T0, T1, T2, T3, T4, T5, T6, and T7.

Among sensing nodes (SN0 to SN7) in the first row, the encoded sensing value d1 of sensing node SN1 in the second column is a difference value (T1-T0) between the sensing value T1 of sensing node SN1 in the second column and the sensing value T0 of sensing node SN0 in the adjacent first column.

Among sensing nodes (SN0 to SN7) in the first row, the encoded sensing value d2 of sensing node SN2 in the third column is a difference value (T2-T1) between the sensing value T2 of sensing node SN2 in the third column and the sensing value T1 of sensing node SN1 in the adjacent second column.

Among sensing nodes (SN0 to SN7) in the first row, the encoded sensing value d3 of sensing node SN3 in the fourth column is a difference value (T3-T2) between the sensing value T3 of sensing node SN3 in the fourth column and the sensing value T2 of sensing node SN2 in the adjacent third column.

Among sensing nodes (SN0 to SN7) in the first row, the encoded sensing value d4 of sensing node SN4 in the fifth column is a difference value (T4-T3) between the sensing value T4 of sensing node SN4 in the fifth column and the sensing value T3 of sensing node SN3 in the adjacent fourth column.

Among sensing nodes (SN0 to SN7) in the first row, the encoded sensing value d5 of sensing node SN5 in the sixth column is a difference value (T5-T4) between the sensing value T5 of sensing node SN5 in the sixth column and the sensing value T4 of sensing node SN4 in the adjacent fifth column.

Among sensing nodes (SN0 to SN7) in the first row, the encoded sensing value d6 of sensing node SN6 in the seventh column is a difference value (T6-T5) between the sensing value T6 of sensing node SN6 in the seventh column and the sensing value T5 of sensing node SN5 in the adjacent sixth column.

Among sensing nodes (SN0 to SN7) in the first row, the encoded sensing value d7 of sensing node SN7 in the eighth column is a difference value (T7-T6) between the sensing value T7 of sensing node SN7 in the eighth column and the sensing value T6 of sensing node SN6 in the adjacent seventh column.

According to the above-described method, among sensing nodes (SN8 to SN15) in the second row, encoded sensing values (d9 to d15) of sensing nodes (SN9 to SN15) in the second to eighth columns can be obtained. Among sensing nodes (SN16 to SN23) in the third row, encoded sensing values (d17 to d23) of sensing nodes (SN17 to SN23) in the second to eighth columns can be obtained. Among sensing nodes (SN24 to SN31) in the fourth row, encoded sensing values (d25 to d31) of sensing nodes (SN25 to SN31) in the second to eighth columns can be obtained.

Referring to FIG. 13, assuming that sensing values are represented using 12 bits, and encoded sensing values are represented using 8 bits, a comparison between the respective amounts of sensing data SENDATA and encoded sensing data ENC_SENDATA is discussed below.

The amount of sensing data SENDATA including 32 sensing values (T0 to T31) equals to 384 bits (=32*12).

The amount of encoded sensing data ENC_SENDATA, which are sensing data SENDATA encoded through the differential coding technique, equals to 272 bits (=4*(12+7*8)).

When differential coding according to embodiments of the present disclosure is performed, as the amount of the encoded sensing data ENC_SENDATA is reduced by 30% compared to the amount of the sensing data SENDATA, the amount of data transmitted between the touch driving circuit 310 and the touch controller 320 can be reduced by 30%, and the amount of corresponding data transmission time can also be saved by 30%. As a result, power consumption may also be reduced.

Meanwhile, when a touch or near touch occurs, a sensing value of a sensing node SN closest to a location at which the touch or near touch has occurred can vary greater than a sensing value of one or more other neighboring sensing nodes SN. In this case, such a difference value cannot be represented using the number of bits allocated for encoded sensing values. Accordingly, when a touch or near touch occurs, the touch driving circuit 310 can transmit a specific bit steam (e.g., 11111111) and transmit a sensing value of a sensing node corresponding to a touch occurrence location without any changes.

In other words, when a touch or near touch occurs, encoded sensing data ENC_SENDATA transmitted from the touch driving circuit 310 may be configured such that instead of the encoded sensing value, a predetermined specific bit stream (e.g., 11111111) (or a selected bit stream) and an original sensing value are included at a location where the encoded sensing value is to be located.

Here, the specific bit stream also serves to inform the touch controller 320 of the fact that a touch has occurred.

When a touch or near touch occurs, a skip process of sensing value encoding and a specific bit stream transmission process will be described with reference to FIG. 15.

FIG. 15 illustrates an example application of the differential coding technique for encoding sensing data when a touch occurs in the touch display device 100 according to aspects of the present disclosure.

Referring to FIG. 15, each of a sensing value T0 of a first sensing node SN0 and a sensing value T1 of a second sensing node SN1 may be a bit stream of S number of bits, and an encoded sensing value may be a bit stream of D number of bits smaller than S number of bits. For example, S may be 12, and D may be 8. That is, a sensing value may be a bit stream of 12 bits, and an encoded sensing value may a bit stream of 8 bits.

The sensing data may further include a sensing value T2 of a third sensing node SN2 adjacent to the second sensing node SN1.

When a difference value (T2-T1) between a sensing value T2 of the third sensing node SN2 and the sensing value T1 of the second sensing node SN1 is less than or equal to the number of bits (D bits) assigned to the encoded sensing value or a number of bits (e.g., (D-1) bits) resulting from excluding a sign bit from the number of bits (D bits) assigned to the encoded sensing value, the difference value (T2-T1) between the sensing value T2 of the third sensing node SN2 and the sensing value T1 of the second sensing node SN1 can be represented as an encoded sensing value.

In this case, encoded sensing data ENC_SENDATA can include an encoded sensing value d2 of the third sensing node SN2. Here, the encoded sensing value d2 of the third sensing node SN2 is a difference value (T2-T1) between the sensing value T2 of the third sensing node SN2 and the sensing value T1 of the second sensing node SN1.

When the difference value (T2-T1) between the sensing value T2 of the third sensing node SN2 and the sensing value T1 of the second sensing node SN1 is larger than the number of bits (D bits) assigned to the encoded sensing value or a number of bits (e.g., (D-1) bits) resulting from excluding a sign bit from the number of bits (D bits) assigned to the encoded sensing value, the difference value (T2-T1) between the sensing value T2 of the third sensing node SN2 and the sensing value T1 of the second sensing node SN1 cannot be represented as an encoded sensing value.

Accordingly, when a touch or near touch occurs in the third sensing node SN2, the encoded sensing data ENC_SENDATA may not include the encoded sensing value d2 of the third sensing node SN2, but include a predetermined specific bit stream (or a selected bit stream) and the sensing value T2 of the third sensing node SN2 represented as S number of bits. Here, the third sensing node SN may be a sensing node SN corresponding to touch coordinates.

For example, the predetermined specific bit stream or a selected bit stream may be a bit stream having the same number of bits as the encoded sensing value. The predetermined specific bit stream may be a bit stream including D number of "1's." In other embodiments, it may be a selected bit stream rather than a predetermined bit stream.

Figure 16:
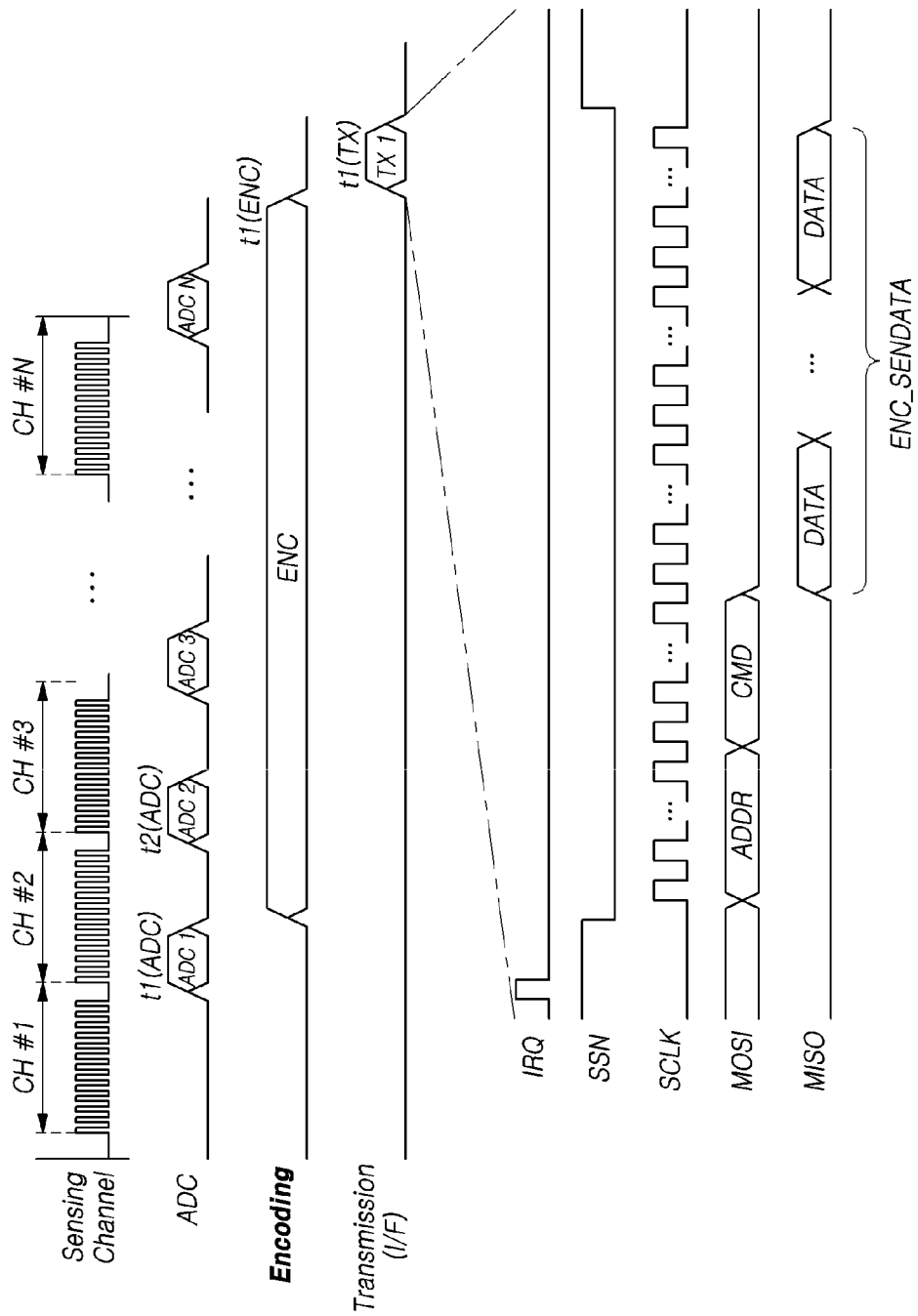
FIG. 16 is a timing diagram related to operation for reducing the number of times of transmitting encoded sensing data from the touch driving circuit to touch controller in the touch sensing system according to aspects of the present disclosure.

FIG. 16 is a timing diagram related to operation for reducing the number of times of transmitting encoded sensing data ENC_SENDATA from the touch driving circuit 310 to touch driving controller 320 in the touch sensing system according to aspects of the present disclosure.

Referring to FIG. 16, while performing first to Nth analog-to-digital converting processes (ADC 1 to ADC N) according to sensing processing timings for first to Nth sensing groups, the touch driving circuit 310 can generate encoded sensing data ENC_SENDATA by continuously performing encoding processing for all sensing data SENDATA for Nth sensing groups.

After completing a last analog-to-digital converting process (ADC N) among the first to Nth analog-to-digital converting processes (ADC 1 to ADC N), the touch driving circuit 310 also completes the encoding process (ENC), and completes encoded sensing data (ENC_SENDATA) generation.

Thereafter, the touch driving circuit 310 can transmit the encoded sensing data ENC_SENDATA for the N sensing groups to the touch controller 320 through one transmission process TX 1.

In one transmission process TX 1, the touch controller 320 can receive data streams DATA corresponding to the encoded sensing data ENC_SENDATA for the N sensing groups. That is, in one transmission process TX 1, the touch controller 320 can read data streams DATA that are the encoded sensing data ENC_SENDATA for the N sensing groups stored in a memory address designated by the touch driving circuit 310.

As described above, the number of times of transmission processing and the number of times of data transmission can be reduced, and accordingly, sensing processing and analog-to-digital converting processing can be performed without being affected by transmission processing. Accordingly, an overall speed to perform touch sensing can be significantly increased.

For performing touch sensing, the touch driving circuit 310 can include the sensing unit block 512, the analog-to-digital converter 514, the encoder 1010, the communication processor 520, and the like, and operations for touch sensing will be described again in terms of these internal components.

The sensing unit block 512 of the touch driving circuit 310 can output first sensing signals by sensing sensing nodes SN included in a first sensing group corresponding to a first sensing channel CH 1, and output second sensing signals by sensing sensing nodes SN included in a second sensing group corresponding to a second sensing channel CH 2.

The analog-to-digital converter 514 of the touch driving circuit 310 can convert the first sensing signals into first sensing values in a digital form during a first conversion period t1(ADC), and convert the second sensing signals into second sensing values in the digital form during a second conversion period t2(ADC) different from the first conversion period t1(ADC).

The encoder 1010 of the touch driving circuit 310 can generate first encoded sensing data ENC_SENDATA resulting from encoding first sensing data SENDATA in which both the first sensed values and the second sensed values are included by performing encoding processing during a first encoding period t1(ENC).

The communication processor 520 of the touch driving circuit 310 may perform a first transmission process TX 1 of transmitting the first encoded sensing data ENC_SENDATA during a first transmission period t1(TX).

The first encoding period t1(ENC) may be terminated after a first conversion period t1(ADC) and a second conversion period t2(ADC) are terminated.

The first transmission period t1(TX) may be initiated after the first conversion period t1(ADC) and the second conversion period t2(ADC) are terminated.

The first transmission process TX 1 between the touch driving circuit 310 and the touch controller 320 can be performed through the communication interface I/F.

The first transmission process TX 1 is a process for enabling the touch driving circuit 310 to transmit encoded sensing data SENDATA to the touch controller 320, and is a process (read process) in which the touch driving circuit 310 can store the encoded sensing data SENDATA to be supplied to the touch controller 320 in a memory of the touch display device 100, and the touch controller 320 can read the encoded sensing data SENDATA stored in the memory.

Referring to FIGS. 16 and 7 together, when a first analog-to-digital converting (ADC 1) process is completed, to perform the first transmission process TX 1, the touch driving circuit 310 can transmit an interrupt request signal IRQ to the touch controller 320.

The touch driving circuit 310 can transmit the interrupt request signal IRQ through the slave data output line L4. The interrupt request signal IRQ may be a type of the slave data MISO.

Referring to FIGS. 16 and 7, the touch controller 320 can output, through the slave selection signal line L1, a slave selection signal SSN having a first voltage state of the first voltage state and a second voltage state to the touch driving circuit 310 that has transmitted the interrupt request signal IRQ.

The touch controller 320 can output a clock signal SCLK including a plurality of pulses to the touch driving circuit 310 that has transmitted the interrupt request signal IRQ through the clock signal line L2.

Such a slave selection signal SSN may have a first state voltage or a second state voltage. Here, the first state voltage indicates that the touch driving circuit 310 which is a slave connected to the slave selection signal line L1 is selected for communication, and the second state voltage indicates that the touch driving circuit 310 that is the slave connected to the slave selection signal line L1 is not selected for communication.

For example, as illustrated in FIG. 16, the first state voltage may be a low level voltage, and the second state voltage may be a high level voltage. In another example, the first state voltage may be a high level voltage, and the second state voltage may be a low level voltage.

During a period in which the slave selection signal SSN has the first state voltage, the clock signal SCLK has a plurality of pulses. Operation timings of the touch controller 320 and the touch driving circuit 310 are synchronized with the clock signal SCLK.

Referring to FIGS. 16 and 7, after outputting the slave selection signal SSN through the slave selection signal line L1, the touch controller 320 can transmit address information ADDR and command information CMD to the touch driving circuit 310 through the master data output line L3.

The address information ADDR and the command information CMD may be one type of the master data MOSI. The address information ADDR is address information of a memory in the touch display device 100, and is address information in which encoded sensing data ENC_SENDATA are to be stored. The command information CMD may include information for providing a process type to the touch driving circuit 310. In relation to transmission of encoded sensing data ENC_SENDATA, the command information CMD may include information for providing a read process to the touch driving circuit 310.

Referring to FIGS. 16 and 7, during a period in which the slave selection signal SSN has the first state voltage, the touch driving circuit 310 can recognize a read process as a process type through the command information CMD, and can identify an address in the memory at which encoded sensing data ENC_SENDATA is to be stored through the address information ADDR.

Accordingly, the touch driving circuit 310 can output encoded sensing data ENC_SENDATA generated through a first encoding process ENC 1 through the slave data output line L4. The encoded sensing data ENC_SENDATA may be one type of the slave data MISO.

When the touch driving circuit 310 outputs the encoded sensing data SENDATA through the slave data output line L4, the encoded sensing data ENC_SENDATA can be stored in the address in the memory indicated by the address information ADDR.

The touch controller 320 can read data stream DATA corresponding to the encoded sensing data ENC_SENDATA stored in the address in the memory indicated by the address information ADDR.

Thereafter, the touch controller 320 can restore the sensed data SENDATA by decoding the read encoded sensing data ENC_SENDATA, and perform a touch algorithm using the restored sensing data SENDATA.

Figure 17:
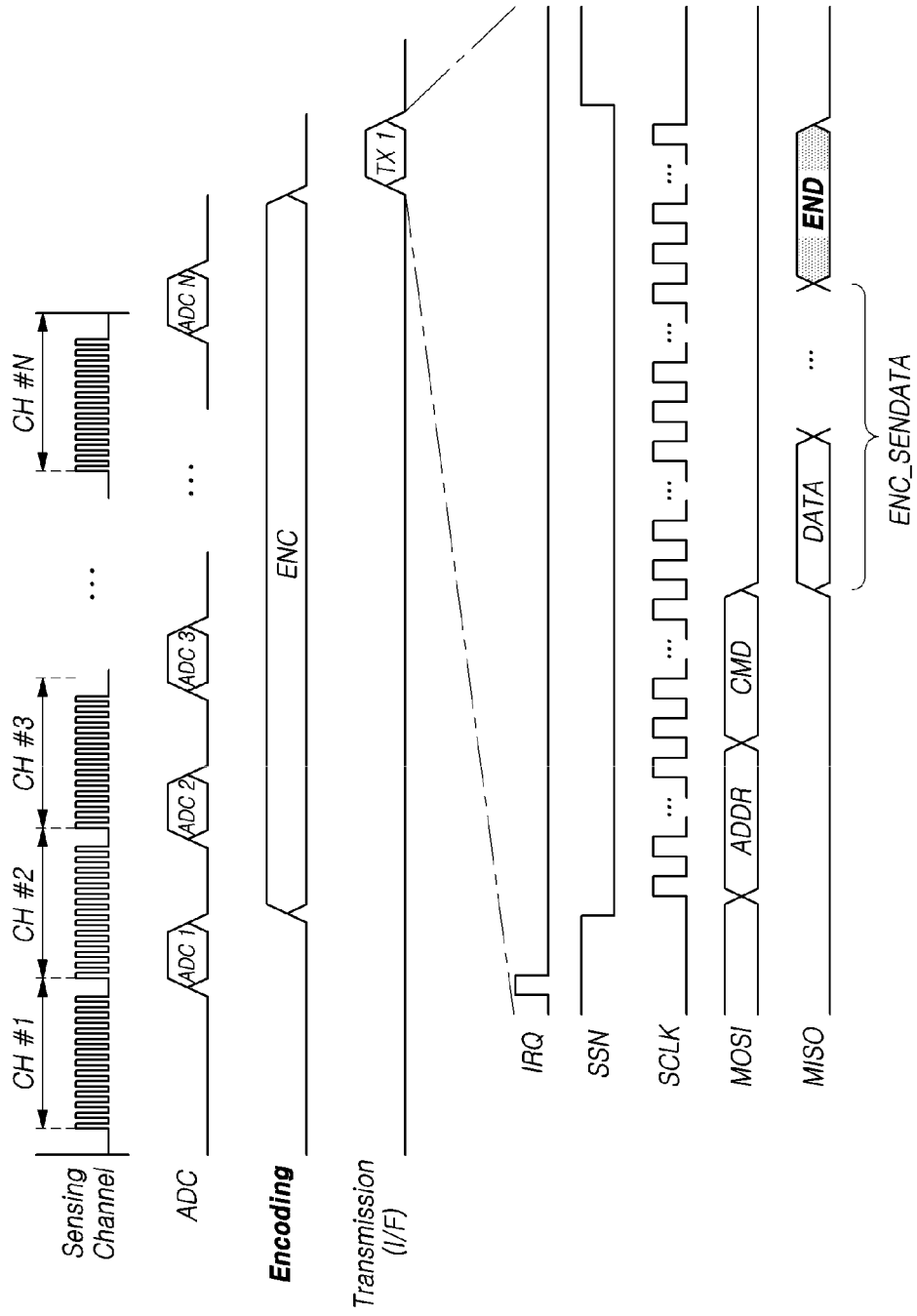
FIGS. 17 and 18 illustrate methods for efficiently transmitting encoded sensing data from the touch driving circuit to touch controller in the touch sensing system according to aspects of the present disclosure.
Figure 18:
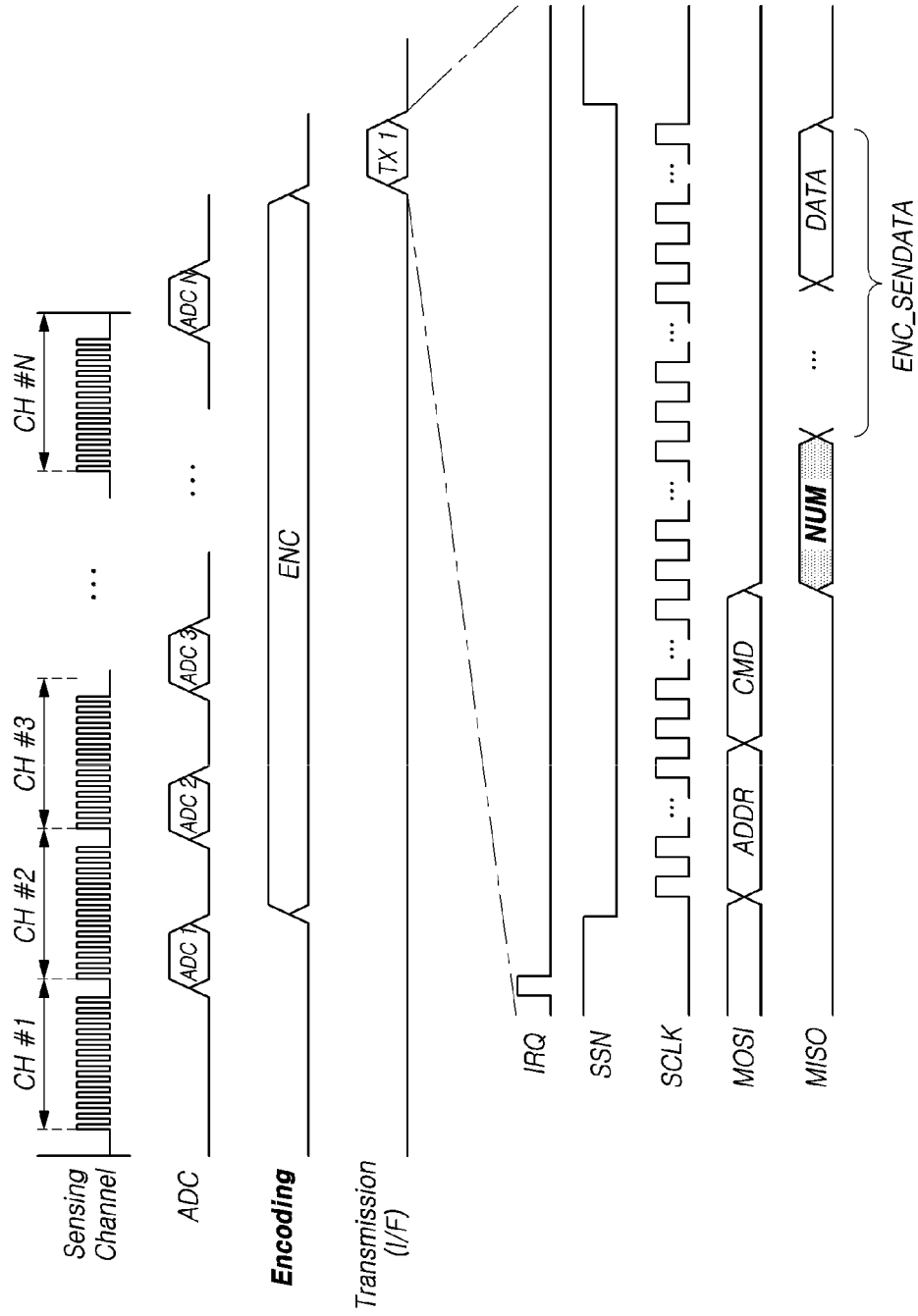

FIGS. 17 and 18 are timing diagrams related to operation for efficiency transmitting encoded sensing data ENC_SENDATA from the touch driving circuit 310 to touch driving controller 320 in the touch sensing system according to aspects of the present disclosure.

As described above with reference to FIG. 16, to reduce the number of data transmissions, when the touch driving circuit 310 collectively transmits respective encoded sensing data ENC_SENDATA for more sensing groups through one transmission process TX 1, a length or size of the encoded sensing data ENC_SENDATA transmitted through one transmission process TX 1 can become larger.

Accordingly, if the touch controller 320 has information on the length or the end of a corresponding data stream for encoded sensing data ENC_SENDATA transmitted from the touch driving circuit 310 through one transmission process TX 1, the touch controller 320 can more accurately perform reception processing (read processing) for the encoded sensing data ENC_SENDATA.

To do this, as illustrated in FIG. 17, the touch driving circuit 310 can transmit an end marker END added to an end part of the encoded sensing data ENC_SENDATA.

This end marker END may have a predetermined or a selected specific value.

For example, such a specific value may be a single bit value or may be represented by a bit steam composed of two or more bits.

When the touch controller 320 recognizes the end marker END, the touch controller 320 can recognize that all reception processing (read processing) for data streams DATA corresponding to encoded sensing data ENC_SENDATA is completed.

Further, as shown in FIG. 18, the touch driving circuit 310 can transmit information NUM on the number of data streams DATA, or information on the length of data streams DATA corresponding to the number of data streams DATA, added to a front part of encoded sensing data ENC_SENDATA. Here, the data streams DATA may mean encoded sensing data ENC_SENDATA.

The information NUM on the number of data streams DATA or the information on the length of data streams DATA may be represented by a bit stream composed of two or more predefined or selected bits.

When the touch controller 320 recognizes the information NUM on the number of data streams DATA or the information on the length of data streams DATA, the touch controller 320 can recognize the number or length of data streams DATA corresponding to encoded sensing data ENC_SENDATA to perform reception processing (read processing), and perform the reception processing (read processing) for data streams corresponding to the recognized number or length of data streams DATA.

Meanwhile, the encoder 1010 of the touch driving circuit 310 can further increase a compression rate of sensing data SENDATA by using one or more encoding techniques.

In some embodiments, the encoder 1010 of the touch driving circuit can perform the differential coding technique, and when beneficial to further increase a compression rate, performs additional encoding before or after the differential coding. Thereafter, the touch driving circuit can transmit encoded sensing data ENC_SENDATA generated through the encoding.

As the additional encoding, an encoding technique for lossless compression of binary data may be employed. The lossless compression is a compression technique that can completely reconfigure a data stream without errors.

For example, the lossless compression technique may include variable length coding VLC, run length encoding RLE, Huffman encoding, and the like.

As described above, the sensing data transmission method (including encoding) according to embodiments of the present disclosure has been described. Hereinafter, the sensing data transmission method (including encoding) according to the embodiments of the present disclosure described above will be briefly described with reference to FIG. 19.

Figure 19:
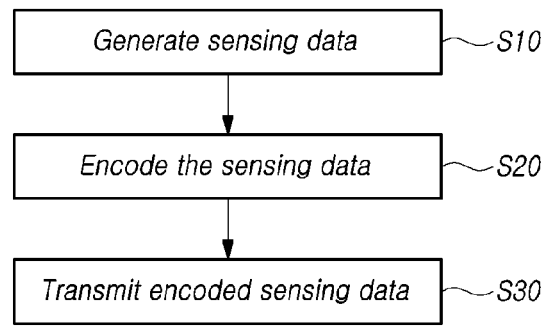
FIG. 19 is a flow diagram illustrating a method of transmitting sensing data in the touch sensing system according to aspects of the present disclosure.

FIG. 19 is a flow diagram illustrating a method of transmitting sensing data in the touch sensing system of the touch display device 100 according to aspects of the present disclosure.

Referring to FIG. 19, the method for transmitting sensing data in the touch sensing system according to embodiments of the present disclosure may include generating, by the touch driving circuit 310, sensing data SENDATA obtained by sensing all, or one or more, of a plurality of sensing nodes SN at step of S10, generating, by the touch driving circuit 310, encoded sensing data ENC_SENDATA by encoding the sensing data SENDATA at step of S20, and transmitting, by the touch driving circuit 310, the encoded sensing data ENC_SENDATA to a touch controller 320 at step of S30.

When the plurality of sensing nodes SN includes a first sensing node SN0 and a second sensing node SN1 adjacent to each other, and the sensing data SENDATA include a sensing value T0 of the first sensing node SN0 and a sensing value T1 of the second sensing node SN1, the encoded sensing data ENC_SENDATA can include the sensing value T0 of the first sensing node SN0 and an encoded sensing value d1 of the second sensing node SN1.

Here, the encoded sensing value d1 of the second sensing node SN1 is a value obtained by encoding the sensing value T1 of the second sensing node SN1, and may be a difference value (T1–T0) between the sensing value T1 of the second sensing node SN1 and the sensing value T0 of the first sensing node SN0.

As described above, according to the embodiments of the present disclosure, it is possible to provide touch display devices, touch driving circuits, touch controllers, and sensing data transmission methods capable of reducing the amount of transmitted data and the amount of data transmission time in the touch system.

According to the embodiments of the present disclosure, it is possible to provide touch display devices, touch driving circuits, touch controllers, and sensing data transmission methods capable of significantly reducing the amount of data transmitted in the touch system by using the encoding techniques.

According to the embodiments of the present disclosure, it is possible to provide touch display devices, touch driving circuits, touch controllers, and sensing data transmission methods capable of reducing the number of times of data transmission in the touch system.

According to the embodiments of the present disclosure, it is possible to provide touch display devices, touch driving circuits, touch controllers, and sensing data transmission methods capable of increasing the speed of touch sensing.

According to the embodiments of the present disclosure, it is possible to provide touch display devices, touch driving circuits, touch controllers, and sensing data transmission methods capable of reducing power consumption.

The embodiments of the present disclosure described above have been described for illustrative purposes; those skilled in the art will appreciate that various modifications, additions and substitutions are possible, without departing from the scope and spirit of the disclosure as disclosed in the accompanying claims. Although the embodiments have been described for illustrative purposes, a person skilled in the art will appreciate that various modifications and applications are possible without departing from the essential characteristics of the present disclosure. For example, the specific components of the embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device comprising:
a touch panel including a plurality of sensing nodes;
a touch driving circuit configured to encode sensing data obtained by sensing of at least one of the plurality of sensing nodes, and transmit encoded sensing data generated through the encoding; and
a touch controller configured to restore the sensing data by decoding the encoded sensing data, and determine either a presence or an absence of a touch or near touch or touch coordinates based on the sensing data,
wherein the plurality of sensing nodes includes a first sensing node and a second sensing node adjacent to each other, wherein the sensing data includes a sensing value of the first sensing node and a sensing value of the second sensing node,
wherein the encoded sensing data includes the sensing value of the first sensing node and an encoded sensing value of the second sensing node, and the encoded sensing value of the second sensing node is a difference value between the sensing value of the second sensing node and the sensing value of the first sensing node,
wherein the plurality of sensing nodes is grouped into a plurality of sensing groups, and the plurality of sensing groups includes a first sensing group and a second sensing group, and
wherein the touch driving circuit comprising:
a sensing circuit block configured to output first sensing signals by sensing nodes included in the first sensing group, and to output second sensing signals by sensing nodes included in the second sensing group;
an analog-to-digital converter configured to convert the first sensing signals into first sensing values in a digital form during a first conversion period, and to convert the second sensing signals into second sensing values in the digital form during a second conversion period different from the first conversion period;
an encoder configured to generate first encoded sensing data by encoding first sensing data including the first sensing values and the second sensing values during a first encoding period; and
a communication processor configured to transmit the first encoded sensing data during a first transmission period, and
wherein the first encoding period is terminated after the first conversion period and the second conversion period are terminated, and the first transmission period is initiated after the first conversion period and the second conversion period are terminated.

2. The touch display device according to claim 1, wherein each of the sensing value of the first sensing node and the sensing value of the second sensing node is a bit stream of S number of bits, and the encoded sensing value is a bit stream of D number of bits smaller than the S number of bits, and
wherein the sensing data further includes a sensing value of a third sensing node adjacent to the second sensing node, and if a difference value between the sensing value of the third sensing node and the sensing value of the second sensing node is not able to be represented using the bit stream of D number of bits, or to be represented using a bit stream of bits resulting from excluding a sign bit from the D number of bits, the encoded sensing data includes a selected bit stream and the sensing value of the third sensing node, instead of including an encoded sensing value of the third sensing node.

3. The touch display device according to claim 2, wherein the selected bit stream is a bit stream including D number of "1's".

4. The touch display device according to claim 2, wherein the third sensing node is a sensing node corresponding to the touch coordinates.

5. The touch display device according to claim 1, wherein each of the sensing value of the first sensing node and the sensing value of the second sensing node is a bit stream of S number of bits, and the encoded sensing value is a bit stream of D number of bits smaller than the S number of bits,
wherein the sensing data further includes a sensing value of a third sensing node adjacent to the second sensing node, and
wherein if a difference value between the sensing value of the third sensing node and the sensing value of the second sensing node is able to be represented using the bit stream of D number of bits, or to be represented using a bit stream of bits resulting from excluding a sign bit from the D number of bits, the encoded sensing data includes an encoded sensing value of the third sensing node, and the encoded sensing value of the third sensing node is a difference value between the sensing value of the third sensing node and the sensing value of the second sensing node.

6. A touch display device comprising:
a touch panel including a plurality of sensing nodes;
a touch driving circuit configured to encode sensing data obtained by sensing of at least one of the plurality of sensing nodes, and transmit encoded sensing data generated through the encoding; and
a touch controller configured to restore the sensing data by decoding the encoded sensing data, and determine either a presence or an absence of a touch or near touch or touch coordinates based on the sensing data,
wherein the plurality of sensing nodes includes a first sensing node and a second sensing node adjacent to each other, wherein the sensing data includes a sensing value of the first sensing node and a sensing value of the second sensing node,
wherein the encoded sensing data includes the sensing value of the first sensing node and an encoded sensing value of the second sensing node, and the encoded sensing value of the second sensing node is a difference value between the sensing value of the second sensing node and the sensing value of the first sensing node,
wherein the plurality of sensing nodes is grouped into a plurality of sensing groups, and the plurality of sensing groups includes a first sensing group and a second sensing group,
wherein the touch driving circuit includes:
a sensing circuit block configured to output first sensing signals by sensing nodes included in the first sensing group, and to output second sensing signals by sensing nodes included in the second sensing group;
an analog-to-digital converter configured to convert the first sensing signals into first sensing values in a digital form during a first conversion period, and to convert the second sensing signals into second sensing values in the digital form during a second conversion period different from the first conversion period;
an encoder configured to generate first encoded sensing data by encoding first sensing data including the first sensing values during a first encoding period, and generate second encoded sensing data by encoding second sensing data including the second sensing values during a second encoding period different from the first sensing period; and
a communication processor configured to transmit the first encoded sensing data during a first transmission period, and transmit the second encoded sensing data during a second transmission period different from the transmission period, and
wherein the first conversion period, the first encoding period, and the first transmission period are sequentially terminated, and the second conversion period, the second encoding period, and the second transmission period are sequentially terminated.

7. The touch display device according to claim 1, wherein the touch driving circuit transmits an end marker added to an end part of the encoded sensing data, or transmits information on the number or length of data streams added to a front part of the encoded sensing data.

8. A touch driving circuit comprising:
a touch sensing processor configured to generate sensing data obtained by sensing one or more of a plurality of sensing nodes;
an encoder configured to generate encoded sensing data by encoding the sensing data; and
a communication processor configured to transmit the encoded sensing data,
wherein the plurality of sensing nodes includes a first sensing node and a second sensing node adjacent to each other, and the sensing data includes a sensing value of the first sensing node and a sensing value of the second sensing node, and the encoded sensing data includes the sensing value of the first sensing node and an encoded sensing value of the second sensing node, and the encoded sensing value of the second sensing node is a difference value between the sensing value of the second sensing node and the sensing value of the first sensing node,
wherein the plurality of sensing nodes is grouped into a plurality of sensing groups, and the plurality of sensing groups includes a first sensing group and a second sensing group, and
wherein the touch driving circuit comprising:
a sensing circuit block configured to output first sensing signals by sensing nodes included in the first sensing group, and to output second sensing signals by sensing nodes included in the second sensing group;
an analog-to-digital converter configured to convert the first sensing signals into first sensing values in a digital form during a first conversion period, and to convert the second sensing signals into second sensing values in the digital form during a second conversion period different from the first conversion period;
an encoder configured to generate first encoded sensing data by encoding first sensing data, in which the first sensing values and the second sensing values are integrated and included, during a first encoding period; and
a communication processor configured to transmit the first encoded sensing data during a first transmission period, and
wherein the first encoding period is terminated after the first conversion period and the second conversion period are terminated, and the first transmission period is initiated after the first conversion period and the second conversion period are terminated.

9. The touch driving circuit according to claim 8, wherein each of the sensing value of the first sensing node and the sensing value of the second sensing node is a bit stream of S number of bits, and the encoded sensing value of the second sensing node is a bit stream of D number of bits smaller than the S number of bits, and wherein the sensing data further includes a sensing value of a third sensing node adjacent to the second sensing node, and if a difference value between the sensing value of the third sensing node and the sensing value of the second sensing node is not able to be represented using the bit stream of D number of bits, or to be represented using a bit stream of bits resulting from excluding a sign bit from the D number of bits, the encoded sensing data includes a selected bit stream and the sensing value of the third sensing node, instead of including an encoded sensing value of the third sensing node.

10. The touch driving circuit according to claim 9, wherein the selected bit stream is a bit stream including D number of "1's".

11. The touch driving circuit according to claim 9, wherein the third sensing node is a sensing node corresponding to touch coordinates.

12. The touch driving circuit according to claim 8, wherein the communication processor transmits an end marker added to an end part of the encoded sensing data, or transmits information on the number or length of data streams added to a front part of the encoded sensing data.

13. A controller comprising:
a communication processor configured to receive encoded sensing data from a touch driving circuit;
a decoder configured to restore sensing data by decoding the encoded sensing data; and
a touch processor unit configured to determine either a presence or an absence of a touch or a nearby touch based on the restored sensing data,
wherein the sensing data includes respective sensing values of a first sensing node and a second sensing node adjacent to each other among a plurality of sensing nodes in a touch panel,
wherein the encoded sensing data includes a sensing value of the first sensing node and an encoded sensing value of the second sensing node, and the encoded sensing value of the second sensing node is a difference value between the sensing value of the second sensing node and the sensing value of the first sensing node,
wherein the plurality of sensing nodes is grouped into a plurality of sensing groups, and the plurality of sensing groups includes a first sensing group and a second sensing group,
wherein the encoded sensing data is data generated by performing an encoding process on sensing data including the sensing value of the first sensing node and the sensing value of the second sensing node at once,
wherein the sensing value of the first sensing node is generated by a first conversion process before the encoding process in the touch driving circuit, and
wherein the sensing value of the second sensing node is generated by a second transformation process before the encoding process in the touch driving circuit.

14. The controller according to claim 13, wherein each of the sensing value of the first sensing node and the sensing value of the second sensing node is a bit stream of S number of bits, and the encoded sensing value of the second sensing node is a bit stream of D number of bits smaller than the S number of bits, and wherein the sensing data further includes a sensing value of a third sensing node adjacent to the second sensing node, and if a difference value between the sensing value of the third sensing node and the sensing value of the second sensing node is not able to be represented using the bit stream of D number of bits, or to be represented using a bit stream of bits resulting from excluding a sign bit from the D number of bits, the encoded sensing data includes a selected bit stream and the sensing value of the third sensing node, instead of including an encoded sensing value of the third sensing node.

15. The controller according to claim 14, wherein when the selected bit stream is identified, the controller recognizes a touch occurrence situation.

\* \* \* \* \*